(12) United States Patent
Onaizi et al.

(10) Patent No.: US 11,420,150 B2
(45) Date of Patent: Aug. 23, 2022

(54) AMINATED MAGNESIUM OXIDE ADSORBENT AND A METHOD OF CAPTURING CARBON DIOXIDE

(71) Applicant: King Fahd University of Petroleum and Minerals, Dhahran (SA)

(72) Inventors: Sagheer A. Onaizi, Dhahran (SA); Ali M. Alkadhem, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 352 days.

(21) Appl. No.: 16/797,830

(22) Filed: Feb. 21, 2020

(65) Prior Publication Data
US 2021/0260520 A1    Aug. 26, 2021

(51) Int. Cl.
B01D 53/02    (2006.01)
B01D 53/04    (2006.01)

(52) U.S. Cl.
CPC .. B01D 53/0462 (2013.01); *B01D 2253/1124* (2013.01); *B01D 2257/504* (2013.01)

(58) Field of Classification Search
CPC ........ B01D 53/0462; B01D 2253/1124; B01D 2257/504
See application file for complete search history.

(56) References Cited

U.S. PATENT DOCUMENTS

| | | |
|---|---|---|
| 4,810,266 A | 3/1989 | Zinnen et al. |
| 5,087,597 A | 2/1992 | Leal et al. |
| 5,492,683 A | 2/1996 | Birbara et al. |
| 5,876,488 A | 3/1999 | Birbara et al. |
| 6,908,497 B1 | 6/2005 | Sirwardane |
| 7,795,175 B2 | 9/2010 | Olah et al. |
| 9,242,225 B2 | 1/2016 | Kwon et al. |
| 9,272,262 B2 | 3/2016 | Polshettiwar et al. |
| 9,370,743 B2 | 6/2016 | Kwon et al. |
| 9,457,340 B2 | 10/2016 | Buelow et al. |
| 9,604,195 B2 | 3/2017 | Eddaoudi et al. |
| 9,663,627 B2 | 5/2017 | Eddaoudi et al. |
| 9,844,766 B2 | 12/2017 | Eom et al. |
| 10,232,307 B2 | 3/2019 | Sprachmann et al. |
| 2005/0281723 A1* | 12/2005 | Carre ............ B01J 20/041 423/220 |
| 2011/0168018 A1* | 7/2011 | Mohamadalizadeh ............ B82Y 30/00 95/137 |
| 2018/0361352 A1 | 12/2018 | Gross et al. |
| 2021/0260561 A1* | 8/2021 | Onaizi ............ B01J 20/3272 |

FOREIGN PATENT DOCUMENTS

CN    103702740 B    11/2016

OTHER PUBLICATIONS

Ouyang, et al.; Polyethyleneimine (PEI) loaded MgO—SiO nanofibers from sepiolite minerals for reusable CO capture/release applications; Applied Clay Science, vol. 152; pp. 267-275; Feb. 2018; Abstract Only; 2 pages.

Wang, et al.; Amine-modified Mg—MOF-74/CPO-27-Mgmembranewithenhanced H2/CO2 separation; Chemical Engineering Science 124; pp. 27-36; Oct. 27, 2014; 10 Pages.

Hu, et al.; CO Adsorption on Porous Materials: Experimental and Simulation Study; Advances in CO2 Conversion and Utilization, Chapter 14; pp. 209-232; Dec. 3, 2010; 2 Pages; Abstract Only.

Kasikamphaiboon, et al.; CO2 Adsorption from Biogas Using Amine-Functionalized MgO; International Journal of Chemical Engineering; Dec. 13, 2018; 9 Pages.

* cited by examiner

Primary Examiner — Christopher P Jones
(74) Attorney, Agent, or Firm — Oblon, McClelland, Maier & Neustadt, L.L.P.

(57) ABSTRACT

An aminated magnesium oxide adsorbent, which is the reaction product of a magnesium oxide matrix having disordered mesopores and an amino silane, wherein amine functional groups are present on an external surface and within the disordered mesopores of the magnesium oxide matrix, and wherein the aminated magnesium oxide adsorbent has an average pore volume of 0.2 to 0.4 $cm^3/g$. A method of making the aminated magnesium oxide adsorbent and a method of capturing $CO_2$ from a gas mixture with the aminated magnesium oxide adsorbent are also described.

20 Claims, 4 Drawing Sheets

AMINATED MAGNESIUM OXIDE ADSORBENT AND A METHOD OF CAPTURING CARBON DIOXIDE

STATEMENT OF ACKNOWLEDGEMENT

This work was supported by the Deanship of Scientific Research (DSR) at King Fahd University of Petroleum and Minerals (KFUPM) in the terms of Internal Research Grant # IN151020.

BACKGROUND OF THE INVENTION

Field of the Invention

The present invention relates to an aminated magnesium oxide adsorbent, methods of making the aminated magnesium oxide adsorbent, and methods of capturing carbon dioxide ($CO_2$) with the aminated magnesium oxide adsorbent.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Global warming is a serious problem facing human civilization. An increase in the average Earth temperature by even a few degrees might lead to the melting of the polar ice caps, a significant increase in the water level of oceans and seas and, thus, the submerging of some islands and coastal cities. The predicted increase in the average Earth temperature in this century is about 1.5° C. if the emissions of greenhouse gases continue at their current rates. See G. Gómez-Pozuelo, E.S. Sanz-Perez, A. Arencibia, P. Pizarro, R. Sanz, D. P. Serrano, $CO_2$ adsorption on amine-functionalized clays, Microporous and Mesoporous Materials, 282 (2019) 38-47, incorporated herein by reference in its entirety. Despite these consequences, carbon dioxide ($CO_2$) emissions continue to rise. The current $CO_2$ concentration in the atmosphere is about 410 ppm compared to about 300 ppm in the middle of the twentieth century. The average annual increase in the atmospheric level of $CO_2$ in the past few decades has been estimated to be about 2 ppm, which is an alarming $CO_2$ accumulation rate in the atmosphere. See M. Fasihi, O. Efimova, C. Breyer, Techno-economic assessment of $CO_2$ direct air capture plants, Journal of Cleaner Production, 224 (2019) 957-980, incorporated herein by reference in their entirety. Thus, $CO_2$ capture and sequestration is a key area of research.

A number of processes have been developed and utilized for $CO_2$ capture; the most common one is $CO_2$ absorption into an aqueous solution of a suitable amine(s). See P. J. G. Huttenhuis, N. J. Agrawal, J. A. Hogendoorn, G. F. Versteeg, Gas solubility of $H_2S$ and $CO_2$ in aqueous solutions of N-methyldiethanolamine, Journal of Petroleum Science and Engineering, 55 (2007) 122-134; H. Zare Aliabad, S. Mirzaei, Removal of $CO_2$ and $H_2S$ using Aqueous Alkanolamine Solutions, World Academy of Science, Engineering and Technology, 3 (2009) 50-59; E. B. Rinker, S. S. Ashour, O. C. Sandall, Absorption of carbon dioxide into aqueous blends of diethanolamine and methyldiethanolamine, Industrial & engineering chemistry research, 39 (2000) 4346-4356; C. H. Yu, C. H. Huang, C. S. Tan, A Review of $CO_2$ Capture by Absorption and Adsorption, Aerosol and Air Quality Research, 12 (2012) 745-769; and A. A. Olajire, $CO_2$ capture and separation technologies for end-of-pipe applications energy 35 (2010) 2610-2628, each incorporated herein by reference in their entirety. However, this process is corrosive, energy-intensive, and utilizes environmentally unfriendly amines. Accordingly, several alternatives such as cryogenic distillation, adsorption, membrane separation, and microbial treatment have been sought. Among these processes, adsorption is the most attractive due to its simplicity, low energy requirement, and ease of regeneration/reuse of the utilized adsorbents. See K. Maqsood, A. Mullick, A. Ali, K. Kargupta, S. Ganguly, Cryogenic carbon dioxide separation from natural gas: A review based on conventional and novel emerging technologies, Reviews in Chemical Engineering, 30 (2014) 453-477; H. Bamdad, K. Hawboldt, S. MacQuarrie, A review on common adsorbents for acid gases removal: Focus on biochar, Renewable and Sustainable Energy Reviews, 81 (2018) 1705-1720; F. D. Lamari, P. Langlois, M. Dicko, C. Chile, C. Chilev, I. Pentchev, Carbon dioxide capture by adsorption, Journal of Chemical Technology and Metallurgy, 51 (2016) 609-626; G. George, N. Bhoria, S. AlHallaq, A. Abdala, V. Mittal, Polymer membranes for acid gas removal from natural gas, Separation and Purification Technology, 158 (2016) 333-356; B. Belaissaoui, E. Favre, Membrane Separation Processes for Post-Combustion Carbon Dioxide Capture: State of the Art and Critical Overview, Oil Gas Sci. Technol.— Rev. IFP Energies nouvelles, 69 (2014) 1005-1020; and S. Choi, J. H. Drese, C. W. Jones, Adsorbent Materials for Carbon Dioxide Capture from Large Anthropogenic Point Sources, ChemSusChem, 2 (2009) 796-854, each incorporated herein by reference in their entirety.

Despite the above attractive characteristics of adsorption, many known adsorbents have low $CO_2$ adsorption capacity, making them less appealing to industry. Research has thus focused on developing new adsorbents for $CO_2$ capture with higher $CO_2$ adsorption capacity. Generally, most of the developed adsorbents are microporous/mesoporous silica, carbon-based adsorbents, metal oxides, and metal-organic frameworks (MOFs). See X. Liu, J. Li, L. Zhou, D. Huang, Y. Zhou, Adsorption of $CO_2$, $CH_4$ and $N_2$ on ordered mesoporous silica molecular sieve, Chemical Physics Letters, 415 (2005) 198-201; S.-H. Liu, Y.-C. Lin, Y.-C. Chien, H.-R. Hyu, Adsorption of $CO_2$ from Flue Gas Streams by a Highly Efficient and Stable Aminosilica Adsorbent, Journal of the Air & Waste Management Association, 61 (2011) 226-233; M. M. Maroto-Valer, Z. Tang, Y. Zhang, $CO_2$ capture by activated and impregnated anthracites, Fuel Processing Technology, 86 (2005) 1487-1502; M. C. Castrillon, K. O. Moura, C. A. Alves, M. Bastos-Neto, D. C. S. Azevedo, J. Hofmann, J. Wilmer, W.-D. Einicke, R. Glaser, $CO_2$ and $H_2S$ Removal from $CH_4$-Rich Streams by Adsorption on Activated Carbons Modified with $K_2CO_3$, NaOH, or $Fe_2O_3$, Energy & Fuels, 30 (2016) 9596-9604; L. Li, X. Wen, X. Fu, F. Wang, N. Zhao, F. Xiao, W. Wei, Y. Sun, $MgO/Al_2O_3$ Sorbent for $CO_2$ Capture, Energy & Fuels, 24 (2010) 5773-5780; A. Hakim, T. S. Marliza, N. M. Abu Tahari, R. W. N. Wan Isahak, R. M. Yusop, W. M. Mohamed Hisham, A. M. Yarmo, Studies on $CO_2$ Adsorption and Desorption Properties from Various Types of Iron Oxides (FeO, $Fe_2O_3$, and $Fe_3O_4$), Industrial & Engineering Chemistry Research, 55 (2016) 7888-7897; T. Remy, S. A. Peter, S. Van der Perre, P. Valvekens, D. E. De Vos, G. V. Baron, J. F. M. Denayer, Selective Dynamic $CO_2$ Separations on Mg—MOF-74 at Low Pressures: A Detailed Comparison with 13X, The Journal of Physical Chemistry C, 117 (2013) 9301-9310; and S. Couck, J. F. M. Denayer, G. V. Baron, T. Rémy, J. Gascon, F. Kapteijn, An Amine-Functionalized MIL-53 Metal—Organic Framework with Large Separation Power for $CO_2$ and $CH_4$, Journal of the American Chemical Society, 131 (2009) 6326-6327, each incorporated herein by reference in their entirety. Although these adsorbents show promising results, most of them require high pressure or temperature to function effectively. See S. Choi, J. H. Drese, C. W. Jones, Adsorbent Materials for Carbon Dioxide Capture from Large Anthropogenic Point Sources, ChemSusChem, 2 (2009) 796-854, incorporated herein by reference in its entirety. Moreover, some of these adsorbents are non-regenerable or require prohibitively high regeneration energy. See S. Kumar, S. K. Saxena, A comparative study of $CO_2$ sorption properties for different oxides, Materials for Renewable and Sustainable Energy, 3 (2014) 1-30, incorporated herein by reference in its entirety.

For example, U.S. Pat. No. 5,087,597A discloses a method for the capture of $CO_2$ using a silica gel adsorbent with a maximum $CO_2$ uptake capacity at ambient conditions of 19.6 mg/g. U.S. Pat. No. 5,876,488A discloses the synthesis of an amine supported on AMBERLITE and its use for $CO_2$ adsorption, for example to reduce the partial pressure of $CO_2$ in a gas phase mixture to about 1 mm Hg.

U.S. Pat. No. 5,492,683 discloses a method for preparing a $CO_2$ adsorbent containing 11 wt. % polyethyleneimine, 16 wt. % triethylene glycol, and 73 wt. % AMBERLITE XAD-7, with a $CO_2$ adsorption capacity at 50° C. of about 40 mg/g.

U.S. Pat. No. 4,810 266A discloses a method for $CO_2$ adsorption using aminated carbon molecular sieves that have been treated with alkanolamines, with the best adsorbent providing a maximum $CO_2$ uptake capacity of below 70 mg/g.

U.S. Pat. No. 7,795,175B2 discloses a method for amine and polyamine grafting on a fumed silica surface, with the adsorbents providing $CO_2$ adsorption capacities of up to 105 mg/g.

U.S. Pat. No. 6,908,497B1 discloses a method for preparing dry amine- and/or alcohol-based composites of anhydrous calcium sulfate ($CaSO_4$), and other materials such as silica ($SiO_2$) and alumina ($Al_2O_3$) having maximum $CO_2$ adsorption capacities of roughly 35 mg/g at ambient conditions.

As alternatives to the above-mentioned adsorbents, metal oxides and metal salts such as CaO, $Li_4SiO_4$, and MgO have also been used for $CO_2$ adsorption. See A. M. Kierzkowska, R. Pacciani, C. R. Müller, CaO-Based $CO_2$ Sorbents: From Fundamentals to the Development of New, Highly Effective Materials, ChemSusChem, 6 (2013) 1130-1148; H. Lu, E. P. Reddy, P. G. Smirniotis, Calcium Oxide Based Sorbents for Capture of Carbon Dioxide at High Temperatures, Industrial & Engineering Chemistry Research, 45 (2006) 3944-3949; R. Quinn, R. J. Kitzhoffer, J. R. Hufton, T. C. Golden, A High Temperature Lithium Orthosilicate-Based Solid Absorbent for Post Combustion $CO_2$ Capture, Industrial & Engineering Chemistry Research, 51 (2012) 9320-9327; and A. Hanif, S. Dasgupta, A. Nanoti, Facile Synthesis of High-Surface-Area Mesoporous MgO with Excellent High-Temperature $CO_2$ Adsorption Potential, Industrial & Engineering Chemistry Research, 55 (2016) 8070-8078, each incorporated herein by reference in their entirety. Although these metallic adsorbents can function well at atmospheric pressure, they are typically only effective at relatively high temperatures. High operating temperatures in some cases can cause a severe structural deformation of the adsorbents, deteriorating their adsorption capability upon extended use. See A. M. Kierzkowska, R. Pacciani, C. R. Muller, CaO-Based $CO_2$ Sorbents: From Fundamentals to the Development of New, Highly Effective Materials, ChemSusChem, 6 (2013) 1130-1148; and G. S. Grasa, J. C. Abanades, $CO_2$ Capture Capacity of CaO in Long Series of Carbonation/Calcination Cycles, Industrial & Engineering Chemistry Research, 45 (2006) 8846-8851, each incorporated herein by reference in their entirety. In addition to the above limitations, metal oxide adsorbents require high regeneration temperatures, increasing energy consumption and, thus, the increased operational costs for the adsorption process. See . Kumar, S. K. Saxena, A comparative study of $CO_2$ sorption properties for different oxides, Materials for Renewable and Sustainable Energy, 3 (2014) 1-30, incorporated herein by reference in its entirety. Moreover, the formation of metal carbides through the reaction between $CO_2$ and the metal oxides at high regeneration temperatures makes regeneration a very challenging task. See H. Lu, E. P. Reddy, P. G. Smirniotis, Calcium Oxide Based Sorbents for Capture of Carbon Dioxide at High Temperatures, Industrial & Engineering Chemistry Research, 45 (2006) 3944-3949, incorporated herein by reference in its entirety.

For example, U.S. Pat. No. 9,370,743B2 discloses a method for the synthesis of a barium titanate composite adsorbent for $CO_2$ capture. The adsorbent could not adsorb more than 50 mg/g $CO_2$ at ambient conditions, but increasing the adsorption temperature to 200-550° C. improved the $CO_2$ adsorption capability.

Magnesium oxide has been used in combination with metal salts as an adsorbent for $CO_2$ at high temperatures, and also for other purposes, such as remediation of toxic pollutants and as a catalyst support in a number of reactions. See G. Xiao, R. Singh, A. Chaffee, P. Webley, Advanced adsorbents based on MgO and $K_2CO_3$ for capture of $CO_2$ at elevated temperatures, International Journal of Greenhouse Gas Control, 5 (2011) 634-639; X. Zhao, G. Ji, W. Liu, X. He, E. J. Anthony, M. Zhao, Mesoporous MgO promoted with $NaNO_3$/$NaNO_2$ for rapid and high-capacity $CO_2$ capture at moderate temperatures, Chemical Engineering Journal, 332 (2018) 216-226; J. Hu, Z. Song, L. Chen, H. Yang, J. Li, R. Richards, Adsorption Properties of MgO(111) Nanoplates for the Dye Pollutants from Wastewater, Journal of Chemical & Engineering Data, 55 (2010) 3742-3748; J. H. Lunsford, P. Qiu, M. P. Rosynek, Z. Yu, Catalytic Conversion of Methane and Ethylene to Propylene, The Journal of Physical Chemistry B, 102 (1998) 167-173; and D. Szmigiel, W. Raróg-Pilecka, E. Miśkiewicz, M. Gliński, M. Kielak, Z. Kaszkur, Z. Kowalczyk, Ammonia synthesis over ruthenium catalysts supported on high surface area MgO and MgO—$Al_2O_3$ systems, Applied Catalysis A: General, 273 (2004) 105-112, each incorporated herein by reference in their entirety.

However, there is still a need for new MgO-based adsorbents for $CO_2$ capture technologies that are effective at ambient conditions.

SUMMARY OF THE INVENTION

Accordingly, it is one object of the present invention to provide an aminated magnesium oxide adsorbent, which is the reaction product of a magnesium oxide matrix having disordered mesopores, and an amino silane, wherein amine functional groups are present on an external surface and within the disordered mesopores of the magnesium oxide matrix, and wherein the aminated magnesium oxide adsorbent has an average pore volume of 0.2 to 0.4 $cm^3$/g.

In some embodiments, the magnesium oxide matrix is prepared from precipitation of magnesium hydroxide from a solution of a magnesium salt and ammonium hydroxide, followed by calcination of the magnesium hydroxide at 350 to 450° C.

In some embodiments, the magnesium oxide matrix has a BET surface area of 320 to 380 m²/g.

In some embodiments, the magnesium oxide matrix has an average pore volume of 0.3 to 0.5 cm³/g and an average pore size of 3 to 6 nm. In some embodiments, the magnesium oxide matrix consists essentially of magnesium oxide.

In some embodiments, the amino silane contains one amino group per molecule.

In some embodiments, the amino silane is of formula (I)

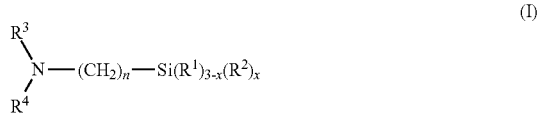

wherein $R^1$ is an optionally substituted alkoxy, an optionally substituted aryloxy, or a halo;

$R^2$ is an optionally substituted alkyl, an optionally substituted aryl, or an optionally substituted arylalkyl;

$R^3$ and $R^4$ are independently hydrogen, an optionally substituted alkyl, an optionally substituted aryl, or an optionally substituted arylalkyl;

n is an integer of 2 to 16; and x is 0, 1, or 2.

In some embodiments, $R^1$ is methoxy or ethoxy, $R^2$ is methyl, ethyl, phenyl, or benzyl, $R^3$ and $R^4$ are each hydrogen, n is 2 or 3, and x is 0 or 1.

In some embodiments, the amino silane is 3-aminopropyl triethoxysilane.

In some embodiments, the aminated magnesium oxide adsorbent has a magnesium content of 15 to 31 wt. %, an oxygen content of 40 to 50 wt. %, a carbon content of 17.5 to 30 wt. %, a nitrogen content of 1 to 6 wt. %, and a silicon content of 2 to 12 wt. %, each based on a total weight of the aminated magnesium oxide adsorbent.

In some embodiments, the aminated magnesium oxide adsorbent has a BET surface area of 100 to 160 m²/g.

In some embodiments, the aminated magnesium oxide adsorbent has an average pore size of 7 to 11 nm.

In some embodiments, the aminated magnesium oxide adsorbent is crystalline by XRD.

In some embodiments, the aminated magnesium oxide adsorbent has a $CO_2$ uptake capacity of 50 to 80 mg $CO_2$ per 1 g of the aminated magnesium oxide adsorbent at 30° C. and 1 atm.

It is another object of the present disclosure to provide a method of making the aminated magnesium oxide adsorbent, the method involving (i) precipitating magnesium hydroxide from a solution of a magnesium salt and ammonium hydroxide, (ii) calcining the magnesium hydroxide at 350 to 450° C. for 6 to 24 hours to form the magnesium oxide matrix having disordered mesopores, and (iii) aminating the magnesium oxide matrix with the amino silane at 60 to 100° C. for 12 to 48 hours.

In some embodiments, a molar ratio of the ammonium hydroxide to the magnesium salt in the solution is 2:1 to 9:1, and wherein the precipitating is performed by heating the solution to 50 to 70° C. for 3 to 10 hours, followed by stirring the solution at 20 to 30° C. for 12 to 48 hours.

In some embodiments, a weight ratio of the amino silane to the magnesium oxide matrix is 1.5:1 to 4:1.

It is yet another object of the present disclosure to provide a method of capturing $CO_2$ from a gas mixture containing $CO_2$ and at least one other gas selected from the group consisting of hydrogen, oxygen, nitrogen, methane, and carbon monoxide, the method involving contacting the gas mixture with the aminated magnesium oxide adsorbent to adsorb at least a portion of the $CO_2$ into the aminated magnesium oxide adsorbent, thereby forming a loaded aminated magnesium oxide adsorbent and a gas stream depleted in $CO_2$ compared to the gas mixture.

In some embodiments, the gas mixture is a pre-combustion gas mixture comprising 15 to 50 vol. % of $CO_2$, based on a total volume of the gas mixture.

In some embodiments, the gas mixture is a post-combustion gas mixture comprising 5 to 15 vol. % of $CO_2$, based on a total volume of the gas mixture.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1:
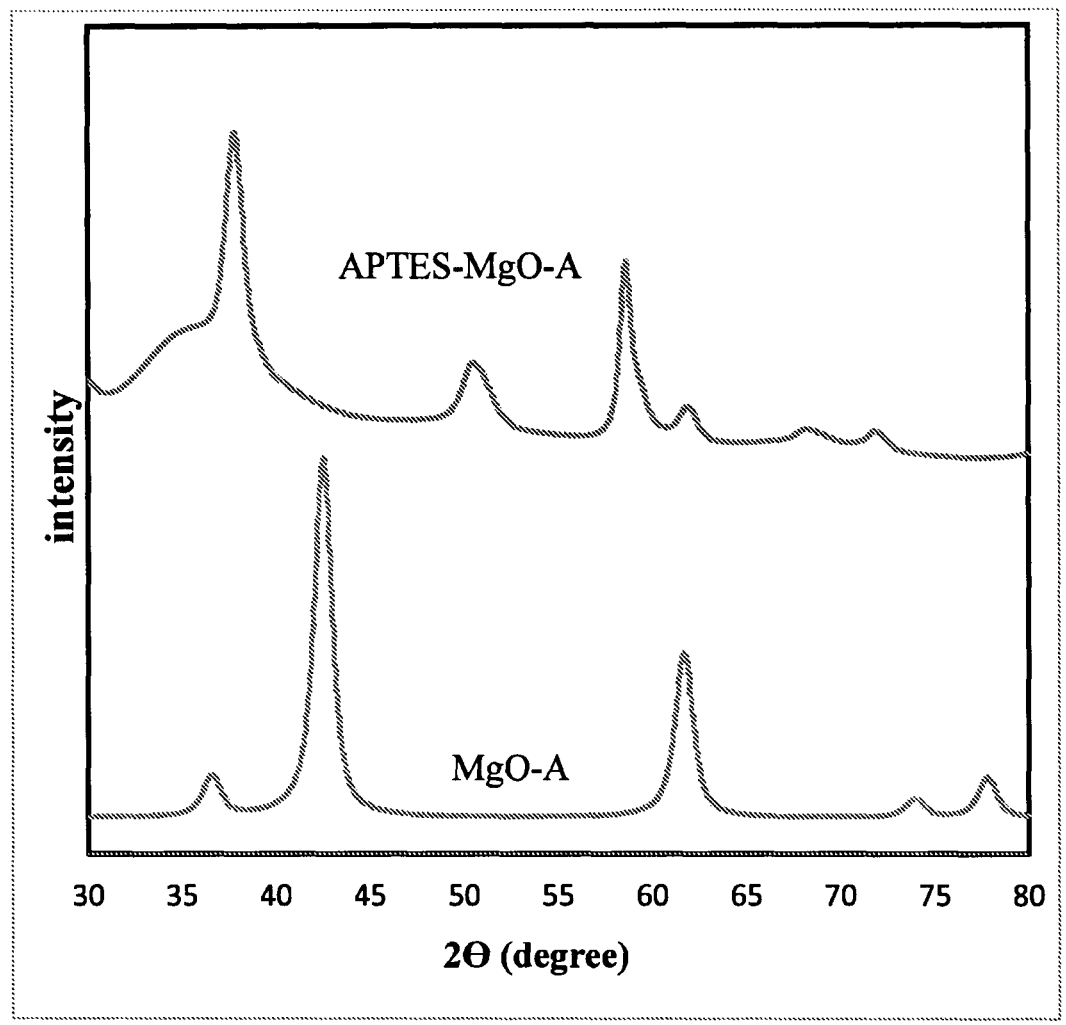
FIG. 1 shows the XRD patterns of the unmodified MgO—A (synthesized using the ammonium hydroxide route) and the MgO—A adsorbent functionalized with 3-aminopropyl triethoxysilane (APTES), referred to herein as "APTES-MgO—A".

In the following description, it is understood that other embodiments may be utilized and structural and operational changes may be made without departure from the scope of the present embodiments disclosed herein.

Definitions

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic (non-aromatic) fragment having 1 to 26 carbon atoms, (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, etc.) and specifically includes, but is not limited to, saturated alkyl groups such as methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, tetradecyl, pentadecyl, hexadecyl, heptadecyl, octadecyl, nonadecyl, eicosyl, guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl); unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl; and cyclic alkyl groups (cycloalkyls) such as cyclopropyl, cyclobutyl, cyclopentyl, cyclohexyl, norbornyl, and adamantyl.

The term "aryl" means a carbocyclic aromatic monocyclic group containing 6 carbon atoms which may be further fused to a second 5- or 6-membered carbocyclic group which may be aromatic, saturated or unsaturated. Aryl includes, but is not limited to, phenyl, anthracenyl, indanyl, 1-naphthyl, 2-naphthyl, and tetrahydronaphthyl. The fused aryls may be connected to another group either at a suitable position on the cycloalkyl/cycloalkenyl ring or the aromatic ring.

The term "arylalkyl", as used herein, refers to a straight or branched chain alkyl moiety (as defined above) that is substituted by an aryl group (as defined above), examples of which include, but are not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "alkoxy" refers to an —O-alkyl group, specific examples of which include, but are not limited to, methoxy, ethoxy, propoxy (e.g., n-propoxy and isopropoxy), and t-butoxy. The term "aryloxy" refers to an —O-aryl group, specific examples of which include, but are not limited to, phenoxy and naphthoxy.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, carboxy, unsubstituted amide (i.e. —$CONH_2$), substituted amide (e.g., —CONHalkyl, —CONHaryl, —CONHarylalkyl or cases where there are two substituents on one nitrogen selected from alkyl, aryl, or arylalkyl), alkoxycarbonyl, aryl, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

Throughout the specification and the appended claims, a given chemical formula or name shall encompass all isomers (stereo and optical isomers and racemates) thereof where such isomers exist. Unless otherwise indicated, all chiral (enantiomeric and diastereomeric) and racemic forms are within the scope of the disclosure. Many geometric isomers of C═C double bonds, C═N double bonds, ring systems, and the like can also be present in the compounds, and all such stable isomers are contemplated in the present disclosure. Cis- and trans- (or E- and Z-) geometric isomers of the compounds of the present disclosure are described and may be isolated as a mixture of isomers or as separated isomeric forms. The present compounds can be isolated in optically active or racemic forms. Optically active forms may be prepared by resolution of racemic forms or by synthesis from optically active starting materials. All processes used to prepare compounds of the present disclosure and intermediates made therein are considered to be part of the present disclosure. When enantiomeric or diastereomeric products are prepared, they may be separated by conventional methods, for example, by chromatography, fractional crystallization, or through the use of a chiral agent. Depending on the process conditions the end products of the present disclosure are obtained either in free (neutral) or salt form. Both the free form and the salts of these end products are within the scope of the disclosure. If so desired, one form of a compound may be converted into another form. A free base or acid may be converted into a salt; a salt may be converted into the free compound or another salt; a mixture of isomeric compounds of the present disclosure may be separated into the individual isomers. Compounds of the present disclosure, free form and salts thereof, may exist in multiple tautomeric forms, in which hydrogen atoms are transposed to other parts of the molecules and the chemical bonds between the atoms of the molecules are consequently rearranged. It should be understood that all tautomeric forms, insofar as they may exist, are included within the disclosure. Further, a given chemical formula or name shall encompass all conformers, rotamers, or conformational isomers thereof where such isomers exist. Different conformations can have different energies, can usually interconvert, and are very rarely isolatable. There are some molecules that can be isolated in several conformations. For example, atropisomers are isomers resulting from hindered rotation about single bonds where the steric strain barrier to rotation is high enough to allow for the isolation of the conformers. It should be understood that all conformers, rotamers, or conformational isomer forms, insofar as they may exist, are included within the present disclosure.

Aminated Magnesium Oxide Adsorbent

The present disclosure provides an aminated magnesium oxide adsorbent that contains a desirable content of amine functional groups on its surface, and that has suitable surface properties (e.g., BET surface area, pore volume, pore size etc.) for use as a selective adsorbent of $CO_2$ gas for $CO_2$ capture technologies.

The aminated magnesium oxide adsorbent of the present disclosure is the reaction product formed from reacting (i) a magnesium oxide matrix (mesoporous) with (ii) an amino silane. The reaction provides amino functional groups on an external surface and within the mesopores of the magnesium oxide matrix which help facilitate the selective adsorption of $CO_2$.

(i) Magnesium Oxide Matrix

The aminated magnesium oxide adsorbent is made from a porous matrix of magnesium oxide. In preferred embodiments, the matrix is composed of substantially pure magnesium oxide, with an elemental composition of magnesium of 45 to 60 wt. %, preferably 45.5 to 58 wt. %, preferably 46 to 56 wt. %, preferably 46.5 to 54 wt. %, preferably 47 to 52 wt. %, preferably 47.2 to 50 wt. %, and oxygen of 40 to 55 wt. %, preferably 42 to 54.5 wt. %, preferably 44 to 54 wt. %, preferably 46 to 53.5 wt. %, preferably 48 to 53 wt. %, preferably 50 to 52.8 wt. %. While the composition of the matrix may vary depending on a number of factors, such as the purity of reagents, the type of reactants/conditions employed for the synthesis of the magnesium oxide, etc., it is preferred that the magnesium oxide matrix employed herein consists essentially of magnesium oxide. In this context, "consists essentially of" is intended to mean a magnesium oxide matrix made of only magnesium and oxygen elements, and optionally residual water (e.g., water molecules entrapped within the pores of the magnesium oxide matrix, moisture derived from standard atmosphere, etc.) and/or residual surface hydroxyl groups, and which contains no other elements such as carbon, nitrogen, silicon, aluminum, potassium, sodium, calcium, transition metals (e.g., zirconium, titanium, iron, copper, chromium, cerium, niobium, vanadium, yttrium, barium, etc.), etc. Thus, "consists essentially of" is intended to exclude from the matrix impurities or other materials which would contribute such above elements including, but not limited to,

- carbon/organic impurities/materials such as oxalic acid, graphene, graphene oxide, activated carbon, fibers or comminuted materials sourced from plants or agricultural products such as fibers or comminuted materials sourced from the husks, shells, stems, roots, leaves (or fronds or leaflets), cores, trunks, inflorescences, fruit, pulp, empty fruit bunches, seeds (pit), or the offshoots of various other plants or agricultural products (e.g., the seeds/nuts and/or seed/nut shells or hulls of almond, brazil, cocoa bean, coconut, cotton, flax, grass, linseed, maize, millet, oat, peach, apricot, date pit/date stones, peanut, rye, soybean, sunflower, walnut, wheat; rice straw; rice bran; rice husk including rice husk ash; crude pectate pulp; peat moss fibers; flax; cotton; cotton linters; wool; sugar cane; jute stick; neem leaves; paper; bagasse; bamboo; corn stalks; wood/wood chips/wood fibers/wood pulp; bark; straw such as wheat straw; pine cone; cork; dehydrated vegetable matter; whole ground corn cobs; corn stalks; corn cob light density pith core; corn cob ground woody ring portion; corn cob chaff portion; cotton seed stems; flax stems; wheat stems; sunflower seed stems; soybean stems; maize stems; rye grass stems; millet stems; cellulosic fibers; cellulose; coconut palm materials such as coconut shells, coconut husks; and oil palm materials such as palm oil fuel ash, palm oil fibers, palm oil shells, and palm oil empty fruit brunches).
- metal oxides such as calcium oxide, potassium oxide, iron oxide, titanium oxide, silica ($SiO_2$), alumina ($Al_2O_3$), alumina tri-hydroxides, aluminum oxide hydroxides (e.g., boehmite), zirconia, silicates such as aluminosilicate (e.g., silica-alumina, zeolites) and magnesium iron aluminum cyclosilicates (e.g., cordierite), ceria, niobia, vanadia, magnesium stabilized zirconia, zirconia stabilized alumina, yttrium stabilized zirconia, calcium stabilized zirconia, magnesium stabilized alumina, calcium stabilized alumina;
- metals such as sodium, zirconium, titanium, iron, copper, chromium, lanthanum, cerium, barium, aluminum titanate, silicon nitride, silicon carbide, including metal ions which may be part of a metal-organic framework (MOF) structure;

among others.

While magnesium oxide may be produced by various methods (e.g., precipitation with sodium hydroxide or oxalic acid, followed by calcination etc.), the inventors have found that an advantageous magnesium oxide material, in terms of surface properties for $CO_2$ adsorption, is produced by precipitation of magnesium hydroxide from a solution of a magnesium salt and ammonium hydroxide, followed by calcination of the magnesium hydroxide at 350 to 450° C., as will be discussed in more detail later. Such a method produces a magnesium oxide matrix formed from individual nanoparticles of MgO having an irregular platelet-like morphology, for example irregular MgO nanoplatelets in the size range of 2 to 100 nm, preferably 5 to 90 nm, preferably 10 to 80 nm, preferably 15 to 70 nm, preferably 20 to 60 nm, preferably 25 to 50 nm, preferably 30 to 45 nm, preferably 35 to 40 nm.

The manner in which the magnesium oxide matrix is made also effects the surface structure/properties of the resulting magnesium oxide matrix, and thus the absorbency properties of the eventual aminated magnesium oxide adsorbent of the present disclosure. As mentioned previously, the magnesium oxide matrix is preferably prepared from precipitation of magnesium hydroxide through the use of ammonium hydroxide, followed by calcination at 350 to 450° C., and the resulting magnesium oxide matrix contains disordered mesopores. The disordered pore structure of the magnesium oxide matrix thus differs from other materials having an ordered pore structure/network such as honeycomb or monolithic materials including flow-through monoliths, wall-flow monoliths, or partial-flow monoliths (e.g., honeycomb or monolithic MgO), molecular organic frameworks (MOFs), zeolitic materials containing ordered mesoporous networks (e.g., MCM-41, SBA-15, ZSM-5, etc.), and the like.

In terms of surface structure/properties, the preferred magnesium oxide matrix of the present disclosure (formed using ammonium hydroxide) has and an average pore size of 3 to 6 nm, preferably 3.4 to 5.8 nm, preferably 3.8 to 5.4 nm, preferably 4.2 to 5.2 nm, preferably 4.6 to 5.0 nm, preferably 4.7 to 4.8 nm. In preferred embodiments, the magnesium oxide material contains only mesopores, and no micropores or macropores are present.

In some embodiments, magnesium oxide matrix has a BET surface area of 320 to 380 $m^2/g$, preferably 330 to 370 $m^2/g$, preferably 335 to 365 $m^2/g$, preferably 340 to 360 $m^2/g$, preferably 345 to 355 $m^2/g$, preferably 350 to 351 $m^2/g$.

In some embodiments, the magnesium oxide matrix has an average pore volume of 0.3 to 0.5 $cm^3/g$, preferably 0.32 to 0.48 $cm^3/g$, preferably 0.34 to 0.46 $cm^3/g$, preferably 0.36 to 0.44 $cm^3/g$, preferably 0.38 to 0.43 $cm^3/g$, preferably 0.4 to 0.42 $cm^3/g$.

The magnesium oxide matrix is preferably crystalline by X-ray diffraction (XRD), preferably having a cubic MgO crystal structure with diffraction peaks at 36.8°, 42.2°, 61.2°, 74.1° and 77.9°, corresponding to the planes (111), (200), (220), (311), and (222) of cubic MgO, respectively.

(ii) Amino Silane

The amino silane may be any reactive (hydrolyzable) silane that contains at least one amino group per molecule (e.g., 1, 2, 3, 4 or more amino groups), for example up to 3 amino groups per molecule, preferably 1 or 2 amino groups per molecule, preferably exactly one amino group per molecule. In the present disclosure, each amino group of the amino silane (and each amino group of the amino silane in reacted form in the aminated magnesium oxide adsorbent) is a basic amino group (non-protonated/non-cationic ammonium form) to allow for interaction with $CO_2$ molecules. The amino group(s) may be a primary amino group ($H_2N$—R), a secondary amino group (R—N(H)—R), a tertiary amino group (R—N(R)—R), or a mixture thereof when more than one amino group is present, preferably the amino group(s) is/are a primary amino group.

In addition to containing at least one amino group per molecule, the amino silane also includes at least 1 reactive silane group (e.g., 1, 2, 3, 4 or more reactive silane groups) per molecule. A reactive silane group is any silane which has at least one hydrolyzable group bonded directly to a Si atom. Hydrolyzable group(s) bonded directly to a Si atom include, but are not limited to, alkoxy groups (e.g., methoxy, ethoxy, propoxy, isopropoxy, t-butoxy, as well as substituted variants), aryloxy groups (e.g., phenoxy), and halo groups (e.g., chloro, bromo), including mixtures thereof. Each reactive silane group may therefore have one, two, or three hydrolyzable groups, which may be the same or different, preferably the same, more preferably each hydrolyzable group present is a methoxy.

Exemplary amino silanes which contain more than one amino group per molecule (e.g., 2, 3) and one reactive silane group per molecule include, but are not limited to, N-(3-(trimethoxysilyl)propyl)ethane-1,2-diamine (AEAPTMS), trimethoxysilylpropyldiethylenetriamine, and trimethoxysilylpropyl polyethyleneimine.

In preferred embodiments, the amino silane contains one amino group per molecule, preferably one primary amino group per molecule, preferably one amino group per molecule and one reactive silane group per molecule. Particularly preferred amino silanes are those of formula (I)

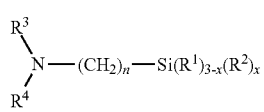

(I)

wherein
$R^1$ is a hydrolyzable group such as an optionally substituted alkoxy, an optionally substituted aryloxy, or a halo;
$R^2$ is an optionally substituted alkyl, an optionally substituted aryl, or an optionally substituted arylalkyl;
$R^3$ and $R^4$ are independently hydrogen, an optionally substituted alkyl, an optionally substituted aryl, or an optionally substituted arylalkyl;
n is an integer of 2 to 16; and
x is 0, 1, or 2.

In preferred embodiments, $R^1$ is an optionally substituted alkoxy group, preferably an unsubstituted alkoxy group, with methoxy, ethoxy, propoxy, isopropoxy being preferred, and with methoxy or ethoxy being most preferred.

In some embodiments, when present, $R^2$ is an optionally substituted $C_1$ to $C_6$ alkyl, preferably an optionally substituted $C_2$ to $C_5$ alkyl, preferably an optionally substituted $C_3$ to $C_4$ alkyl, preferably an unsubstituted alkyl, for example, methyl, ethyl, or propyl. In some embodiments, when present, $R^2$ is an optionally substituted aryl, preferably an unsubstituted aryl, preferably phenyl. In some embodiments, when present, $R^2$ is an optionally substituted $C_7$ to $C_{13}$ arylalkyl, or an optionally substituted $C_8$ to $C_{12}$ arylalkyl, or an optionally substituted $C_9$ to $C_{11}$ arylalkyl, preferably an unsubstituted arylalkyl with benzyl being the most preferable.

$R^3$ and $R^4$ may be the same or different, preferably the same. In some embodiments, $R^3$ and $R^4$ are hydrogen. In some embodiments, $R^3$ and $R^4$ are an optionally substituted alkyl for example, an optionally substituted $C_1$ to $C_6$ alkyl, preferably an optionally substituted $C_2$ to $C_5$ alkyl, preferably an optionally substituted $C_3$ to $C_4$ alkyl, with methyl, ethyl, propyl, 2-hydroxyethyl, and 3-hydroxypropyl being the most preferred. In preferred embodiments, $R^3$ and $R^4$ are each hydrogen (primary amino group).

In preferred embodiments, n is 2 to 10, or 3 to 8, or 4 to 6, preferably n is 2 or 3, preferably 3. In preferred embodiments, x is 0 or 1, preferably 0.

Exemplary amino silanes which contain one amino group per molecule include, but are not limited to, 3-aminopropyl triethoxysilane (APTES), 3-aminopropyl trimethoxysilane (APTMS), 2-aminoethyltrimethoxysilane, 4-aminobutyltriethoxysilane, 5-aminopentyltrimethoxysilane, 6-aminohexylltrimethoxysilane, 7-aminoheptyltriethoxysilane, bis-(2-hydroxyethyl)-3-aminopropyltriethoxysilane, with specific mention being made to 3-aminopropyl triethoxysilane (APTES).

Reacting the magnesium oxide matrix with the amino silane preferably results in a direct covalent bond between reactive hydroxyl groups present on the magnesium oxide surface (Mg—OH) and the reactive silane group of the amino silane, i.e., a silanization reaction product. Of course, the reactive silane group may also participate in hydrolysis and other condensation reactions, however, in terms of anchoring to the magnesium oxide matrix, at least one direct covalent may be formed (Mg—O—Si). Preferably such a silanization reaction takes place whereby the amino functional groups of the amino silane remain unbound to the magnesium oxide matrix, and thus remain capable of interacting with carbon dioxide for carbon dioxide capture applications. Further, reaction with the amino silane provides amino functional groups on various surfaces of the magnesium oxide matrix. In some embodiments, amine functional groups (from the amino silane) are present on both the external surface of the magnesium oxide matrix particles as well as within the pore spaces (mesopores) of the magnesium oxide matrix. External surfaces are those accessible surfaces which are located at or above the basal plane of the aminated magnesium oxide adsorbent material (not within a pore). On the other hand, surfaces within the pore spaces of the aminated magnesium oxide adsorbent are regarded as internal surfaces since they lie below the basal plane of the aminated magnesium oxide adsorbent material. In other words, even though a pore wall may be considered an 'external' surface since it is connected to and accessible from the outside environment, because the pore wall is located beneath the basal plane it is considered to be in an internal surface herein.

The aminated magnesium oxide adsorbent may be the reaction product formed from reacting (i) the magnesium oxide matrix containing disordered mesopores with (ii) a single amino silane or a mixture of two or more amino silanes. Preferably, a single amino silane is used, more preferably a single amino silane having one amino group per molecule (e.g., APTES) is used, more preferably the magnesium oxide matrix is functionalized with only a single amino silane having one amino group per molecule (e.g., APTES), and no other amino silane is used, for example, no amino silane bearing two or more amino groups is used for functionalization.

In preferred embodiments, the aminated magnesium oxide adsorbent is formed only from functionalization of the (i) the magnesium oxide matrix with (ii) the amino silane, and no other functionalization agents are used to functionalize the magnesium oxide matrix surface. Such other functionalization agents may include, but are not limited to, non-amine bearing silanes such as

- alkyl silanes such as methyltrimethoxysilane, methyltriethoxysilane, dimethyldiethoxysilane, ethyltrimethoxysilane, trimethylethoxysilane, dimethyldimethoxysilane, propyltriethoxysilane, propyltrimethoxysilane, isobutyltriethoxysilane, hexyltrimethoxysilane, hexyltriethoxysilane, cyclohexyltriethoxysilane, cyclohexyltributoxysilane, heptyltrimethoxysilane, heptyltriethoxysilane, octyltrimethoxysilane, octyltriethoxysilane, methyloctyldimethoxysilane, methyloctyldiethoxysilane, nonyltrimethoxysilane, nonyltriethoxysilane, decyltrimethoxysilane, decyltriethoxysilane, dodecyltrimethoxysilane, dodecyltriethoxysilane, tetradecyltrimethoxysilane, tetradecyltriethoxysilane, octadecyltrimethoxysilane, and octadecyltriethoxysilane;
- aryl silanes such as ethoxy(diphenyl)vinyl silane, trichloro[4-(chloromethyl)phenyl] silane, dimethoxy (diphenyl) silane, diethoxy(diphenyl) silane, diethoxy(methyl)phenyl silane, trichloro(phenyl) silane, triethoxy(phenyl) silane, and trimethoxy(phenyl) silane;
- arylalkylsilanes such as trimethoxy(2-phenylethyl) silane;
- orthosilicates such as tetraethyl orthosilicate (TEOS), tetramethyl orthosilicate, tetrapropyl orthosilicate, tetrabutyl orthosilicate, tetraallyl orthosilicate, tetrakis(dimethylsilyl) orthosilicate, and tetraamyl orthosilicate;
- halo- or glycidyl-containing silanes such as (3-glycidyloxypropyl) trimethoxysilane (GTPMS), [2-(3,4-epoxycyclohexyl)ethyl]trimethoxysilane, and chloropropyltrimethoxysilane; and
- fluoroalkylsilanes such as 1,1,2,2-perfluorooctyl-trichlorosilane (PFOTS), (heptadecafluoro-1,1,2-2-tetrahydrodecyl)triethoxysilane, (3,3,3-trifluoropropyl) trimethoxysilane, heptadecafluoro-1,1,2,2-tetrahydrodecyl)trichlorosilane, chlorodimethyl (pentafluorophenyl)silane, chloromethyl)methylbis (pentafluorophenyl)silane, diisopropyl(3,3,4,4,5,5,6,6,6-nonafluorohexyl)silane, diisopropyl(3,3,4,4,5,5,6,6,7,7,8,8,8-tridecafluorooctyl)silane, trichloro(3,3,3-trifluoropropyl)silane, trichloro(3,3,4,4,5,5,6,6,7,7,8,8,8-tridecafluorooctyl)silane, triethoxy(4-(trifluoromethyl)phenyl)silane, and tridecafluoro-1,1,2,2-tetrahydrooctyl)trimethoxysilane;

Such other functionalization agents may also include, but are not limited to, polymeric functionalization materials such as polyamines (e.g., polyethyleneimines and polyazetidines for example diethylenetriamine, triethylenetetramine, tetraethylenepentamine, etc., as well as higher analogs), polyamides, epoxy resins (e.g., epoxy chloropropane), peptides, and polyalkylene glycols for example polyethylene glycol.

While the use of intermediate coating/binding/functionalization layers are contemplated, in general the magnesium oxide matrix of the present disclosure is directly functionalized with the amino silane, and no intermediate coating layers, binding layers, or functionalization layers are present. For example, the magnesium oxide matrix is typically not pre-coated or otherwise pre-treated with a silica coating, a magnesium silicate coating, etc. such as those precipitated silica coatings described in US 2018/0326395A1—incorporated herein by reference in its entirety, or alumina sol, aluminum oxide hydroxide, silica sol, titania sol, zirconium acetate, or silicone binders described in U.S. Pat. No. 9,457,340B2—incorporated herein by reference in its entirety, or any other binding layer (e.g., epoxy chloropropane, chloropropyltrimethoxysilane), prior to functionalization with the amino silane.

As a result of the reaction between (i) the magnesium oxide matrix with (ii) the amino silane, the aminated magnesium oxide adsorbent is produced. The elemental constitution of the aminated magnesium oxide adsorbent may vary depending on a number of factors, such as the purity of the magnesium oxide matrix employed in the functionalization process, the amino silane employed in the functionalization process, the relative ratio of the (i) and (ii) (the extent of amine functional group installation), etc. However, the aminated magnesium oxide adsorbent effective in the methods herein generally comprises, each based on a total weight of the aminated magnesium oxide adsorbent:

- magnesium in an amount of 15 to 31 wt. %, preferably 16 to 30 wt. %, preferably 17 to 29 wt. %, preferably 18 to 28 wt. %, preferably 19 to 27 wt. %, preferably 20 to 26 wt. %, preferably 21 to 25 wt. %, preferably 22 to 24 wt. %, preferably 23 to 23.5 wt. %,
- oxygen in an amount of 40 to 50 wt. %, preferably 40.5 to 49 wt. %, preferably 41 to 48 wt. %, preferably 41.5 to 47 wt. %, preferably 42 to 46 wt. %, preferably 42.5 to 45 wt. %, preferably 43 to 44 wt. %,
- carbon in an amount of 17.5 to 30 wt. %, preferably 18 to 29 wt. %, preferably 19 to 28 wt. %, preferably 20 to 27 wt. %, preferably 21 to 26 wt. %, preferably 22 to 25 wt. %, preferably 23 to 24 wt. %,
- nitrogen in an amount of 1 to 6 wt. %, preferably 1.2 to 5.5 wt. %, preferably 1.4 to 5 wt. %, preferably 1.6 to 4.5 wt. %, preferably 1.8 to 4 wt. %, preferably 2 to 3.5 wt. %, preferably 2.2 to 3 wt. %, preferably 2.4 to 2.6 wt. %, and
- silicon in an amount of 2 to 12 wt. %, preferably 3 to 11.5 wt. %, preferably 4 to 11 wt. %, preferably 4.5 to 10.5 wt. %, preferably 5 to 10 wt. %, preferably 5.5 to 9.5 wt. %, preferably 6 to 9 wt. %, preferably 6.5 to 8.5 wt. %, preferably 7 to 8 wt. %, preferably 7.5 to 7.8 wt. %.

Like the magnesium oxide prior to functionalization, the aminated magnesium oxide adsorbent is preferably crystalline by X-ray diffraction (XRD). However, the aminated magnesium oxide adsorbent has some different diffraction peaks, with diffraction peaks at 36.8°, 42.2° (minor), 50.2°, 58.7°, 61.2° (minor), and 72.2°.

Owing at least in part to the functionalization with the amino silane, which without being bound by theory may act to partially obstruct the pores of the magnesium oxide matrix, the aminated magnesium oxide adsorbent herein may have a reduced BET surface area and pore volume, and in some cases a drastically reduced BET surface area and pore volume, compared to the magnesium oxide matrix prior to functionalization. In some embodiments, the aminated magnesium oxide adsorbent has a BET surface area of 100 to 160 m$^2$/g, preferably 110 to 155 m$^2$/g, preferably 115 to 150 m$^2$/g, preferably 120 to 145 m$^2$/g, preferably 125 to 140 m$^2$/g, preferably 130 to 138 m$^2$/g, preferably 132 to 135 m$^2$/g, preferably 134 to 134.5 m$^2$/g.

In some embodiments, the aminated magnesium oxide adsorbent has an average pore volume of 0.2 to 0.4 cm$^3$/g, preferably 0.22 to 0.38 cm$^3$/g, preferably 0.24 to 0.36 cm$^3$/g, preferably 0.26 to 0.34 cm$^3$/g, preferably 0.28 to 0.32 cm$^3$/g, preferably 0.29 to 0.31 cm$^3$/g. In some embodiments, the aminated magnesium oxide adsorbent has an average pore size of 7 to 11 nm, preferably 7.4 to 10.5 nm, preferably 7.6 to 10 nm, preferably 8 to 9.5 nm, preferably 8.5 to 9 nm, preferably 8.9 to 8.95 nm.

The aminated magnesium oxide adsorbent of the present disclosure has an effective adsorption capacity for $CO_2$, which can be determined by thermodynamic, low pressure, single component gas adsorption isotherms. For example, the aminated magnesium oxide adsorbent may have a $CO_2$ uptake capacity, in terms of mg $CO_2$ per 1 g of the aminated magnesium oxide adsorbent at 30° C. and 1 atm, of 50 to 80 mg/g, preferably 52 to 78 mg/g, preferably 54 to 76 mg/g, preferably 56 to 74 mg/g, preferably 58 to 72 mg/g, preferably 60 to 70 mg/g, preferably 62 to 69 mg/g, preferably 64 to 68 mg/g, preferably 66 to 67 mg/g.

While combinations of the aminated magnesium oxide adsorbent of the present disclosure with other sieving/support materials is contemplated, preferably the aminated magnesium oxide adsorbent of the present disclosure is made from only (i) the magnesium oxide matrix and (ii) the amino silane, and no other sieving/support materials are present. Exemplary other sieving/support materials include, but are not limited to, the impurities or other materials listed previously with respect to the matrix, with specific mention being made to hierarchical mesoporous silicates and aluminosilicates (zeolites) such as MCM-41, dendritic silica mesoporous, SBA-15, and ZSM-5; carbonaceous materials such as graphene, graphene oxide, activated carbon; and molecular organic frameworks (MOFs) such as HKUST-1, ZIFs (e.g., ZIF-90), and UiO-66.

Methods of Making the Aminated Magnesium Oxide Adsorbent

The present disclosure also provides methods for making the aminated magnesium oxide adsorbent.

Briefly, such methods may first involve precipitation of magnesium hydroxide from a solution of a magnesium salt and a precipitation agent. The precipitation may be performed by first dissolving a magnesium salt in water (e.g., distilled water), for example at a ratio (w/w) of 0.02:1 to 0.15:1, preferably 0.04:1 to 0.10:1, preferably 0.06:1 to 0.09:1, preferably 0.07:1 to 0.08:1. Acceptable magnesium salts may include, but are not limited to, magnesium nitrate, magnesium chloride, ammonium magnesium phosphate, magnesium bromide, magnesium carbonate, magnesium perchlorate, magnesium phosphate, magnesium sulfate, as well as hydrates thereof. In preferred embodiments, the magnesium salt is magnesium nitrate or a hydrate thereof (e.g., magnesium nitrate hexahydrate).

Next, a precipitation agent is added to effect precipitation of magnesium hydroxide from the resulting solution. The precipitation agent may be employed at a molar ratio of the precipitation agent to the magnesium salt in the solution of from 2:1 to 9:1, preferably 3:1 to 8:1, preferably 4:1 to 7:1, preferably 5:1 to 6:1. While the use of various precipitation agents are contemplated herein, such as ammonium hydroxide, oxalic acid, and sodium hydroxide, it is preferred that ammonium hydroxide is employed as the precipitation agent, as ammonium hydroxide has been found to achieve advantageous results in terms of the structure, surface properties, and adsorption capacity of the final aminated magnesium oxide adsorbent formed, compared to when other precipitation agents are utilized such as oxalic acid and sodium hydroxide. In preferred embodiments, the ammonium hydroxide is added to the solution as a 10 to 36% solution in water (w/w), preferably 15 to 30%, preferably 20 to 25%.

Upon addition of the precipitating agent, the solution may be first agitated (e.g., stirred, shaken, sonicated, etc.) at room temperature (e.g., 20 to 25° C.), then heated to 50 to 70° C., preferably 52 to 68° C., preferably 54 to 66° C., preferably 56 to 64° C., preferably 58 to 62° C., for 3 to 10 hours, preferably 4 to 9 hours, preferably 5 to 8 hours, preferably 6 to 7 hours. At the end of the heating time period, the solution may be cooled to 20 to 30° C., preferably 20 to 25° C., and agitated (e.g., stirred) for an additional for 12 to 48 hours, preferably 16 to 36 hours, preferably 20 to 30 hours, preferably 24 to 26 hours, thereby forming a precipitate.

The precipitate, which contains the magnesium hydroxide, may be collected using any known solid-liquid separation technique, for example, filtration, decantation, centrifugation, etc., and washed with water to remove any water-soluble byproduct (e.g., $NH_4NO_3$) as well as any unreacted metal salt that may remain. The washing may be performed as many times as needed to provide the magnesium hydroxide in desirable purity. Prior to calcination, the magnesium hydroxide may be optionally dried in an oven at 50 to 80° C., preferably 55 to 75 ° C., preferably 60 to 70° C., for 1 to 24 hours, preferably 5 to 20 hours, preferably 10 to 16 hours, preferably 12 to 14 hours, and optionally ground.

Next, the magnesium hydroxide is calcined to form the magnesium oxide matrix. The calcination is preferably performed under air at 350 to 450° C., preferably 360 to 440° C., preferably 370 to 430° C., preferably 380 to 420° C., preferably 390 to 410° C., preferably 400 ° C., for 6 to 24 hours, preferably 7 to 20 hours, preferably 8 to 16 hours, preferably 9 to 14 hours, preferably 10 to 12 hours to form the magnesium oxide matrix having disordered mesopores. While calcinations performed outside of this range may be acceptable in some circumstances, it has been found that the above calcination temperature provides the magnesium oxide matrix with the most advantageous characteristics (e.g., crystallinity, morphology, porosity, composition, and adsorbent capacity). For example, calcinations performed at temperatures below this range may result in incomplete conversion of the magnesium hydroxide to magnesium oxide, which may reduce the adsorption capacity for $CO_2$. On the other hand, calcinations performed at temperatures above this range may cause an unacceptable level of MgO particle agglomeration, which may affect the porosity of the magnesium oxide matrix produced, thus significantly reducing the $CO_2$ adsorption capacity of the material.

The obtained magnesium oxide matrix is then subject to amination with the amino silane (described earlier). Even though the reaction between the magnesium oxide matrix and the amino silane involves a silanization reaction (reaction between the surface of the magnesium oxide matrix containing reactive hydroxyl groups (Mg-OH) and the reactive silane group of the amino silane), it is nonetheless referred to herein as an "amination" reaction based on the functional groups which are installed, i.e., the end result is a magnesium oxide matrix having a surface decorated with amino functional groups.

Amination may be performed by dispersing the magnesium oxide matrix in water, for example in a weight ratio of 0.5:1 to 3:1, preferably 0.6:1 to 2:1, preferably 0.7:1 to 1:1, then adding the amino silane. In some embodiments, the amination is carried out using a weight ratio of the amino silane to the magnesium oxide matrix of from 1.5:1 to 4:1, preferably 1.7:1 to 3.5:1, preferably 1.9:1 to 3:1, preferably 2:1 to 2.5:1. The reaction time and temperature may be varied depending on the reactivity of the reactive silane group of the amino silane, the reactant concentration, etc., however, the magnesium oxide matrix is typically aminated at 60 to 100° C., preferably 65 to 95° C., preferably 70 to 90° C., preferably 75 to 85° C., preferably 80° C., and for 12 to 48 hours, preferably 16 to 36 hours, preferably 20 to 30 hours, preferably 24 to 26 hours. The resulting solid product may then be collected from the reaction mixture using solid-liquid separation techniques (e.g., filtration, centrifugation, etc.), optionally washed with water, and dried for example in an oven at 50 to 80° C., preferably 55 to 75° C., preferably 60 to 70° C., for 1 to 24 hours, preferably 5 to 20 hours, preferably 10 to 16 hours, preferably 12 to 14 hours to form the aminated magnesium oxide adsorbent.

$CO_2$ Capture and Hydrogen Storage Methods

The present disclosure also provides a method of capturing $CO_2$ from a gas mixture with the aminated magnesium oxide adsorbent disclosed herein. The methods herein can be used for the capture of $CO_2$ from large point sources, such as large fossil fuel or biomass electricity power plants, biogas upgrading facilities, industries with major $CO_2$ emissions, natural gas processing, synthetic fuel plants, and fossil fuel-based hydrogen production plants. Capture from the open atmosphere is also possible. Therefore, the aminated magnesium oxide adsorbent may be useful in $CO_2$ removal/capture from various gas mixtures that contain carbon dioxide ($CO_2$) and at least one other gas. The other gas may include, but is not limited to, nitrogen, hydrogen, oxygen, water (vapor), carbon monoxide, hydrocarbons having 1-4 carbon atoms (e.g. methane, ethane, ethylene, acetylene, propane, propylene, butane, iso-butane), nitrogen oxides (i.e. nitric oxide, nitrous oxide, nitrogen dioxide), and noble gases (e.g. helium, neon, argon, krypton, xenon), including mixtures thereof. In preferred embodiments, the other gas is one or more of hydrogen, oxygen, nitrogen, methane, and carbon monoxide, more preferably one or more of nitrogen and methane.

The aminated magnesium oxide adsorbent of the present disclosure may be well-suited for applications where fossil fuels or other energy sources are burned for electricity. For example, the gas mixture may be a pre-combustion gas mixture, that is, a gas mixture produced from a fuel source prior to combustion taking place. Pre-combustion processing is typically used in the production of fertilizer, chemical gaseous fuel ($H_2$, $CH_4$), cement processing, and power production facilities (e.g., biomass power plant), and the like.

For example, in gasification processes a feedstock (such as coal) is partially oxidized in steam and oxygen/air under high temperature and pressure, for instance in a gasifier, to form synthesis gas. This synthesis gas, or syngas, is a mixture of hydrogen, carbon dioxide ($CO_2$) and smaller amounts of other gaseous components, such as methane. Syngas is an important intermediate for production of hydrogen, ammonia, methanol, and synthetic hydrocarbon fuels, and can be produced from many sources, including natural gas, coal, biomass, or virtually any hydrocarbon feedstock, by reaction with steam (steam reforming), carbon dioxide (dry reforming), or oxygen (partial oxidation). For example, syngas can be subject to the water-gas shift reaction to convert CO and water to $H_2$ and $CO_2$, producing a $H_2$ and $CO_2$-rich gas mixture. The $CO_2$ can then be captured and separated, transported, and ultimately sequestered or processed, and the $H_2$-rich fuel combusted. Syngas is also used as an intermediate in producing synthetic petroleum for use as a fuel or lubricant via the Fischer-Tropsch process and previously the Mobil methanol to gasoline process.

In another example, the pre-combustion gas mixture may be a biogas (mostly $CH_4$, $CO_2$, and in some cases $N_2$), and the method of the present disclosure may be applied to biogas upgrading. Here, the biogas is subject to a cleaning process using the aminated magnesium oxide adsorbent whereby the carbon dioxide and any water, nitrogen, hydrogen sulfide, and particulates are removed, if present, to produce biomethane with acceptable pipeline purity for distribution networks to be used as fuel (combusted).

In preferred embodiments, the method is applied to remove/capture $CO_2$ from a pre-combustion gas mixture (e.g., a biogas), for example a pre-combustion gas mixture having a $CO_2$ concentration of 15 to 50 vol. %, preferably 20 to 45 vol. %, preferably 25 to 40 vol. %, preferably 30 to 35 vol. %, based on a total volume of the (pre-combustion) gas mixture.

Alternatively, the gas mixture may be a post-combustion gas mixture, i.e., a gas mixture produced after combustion of a fossil fuel, for example the gas mixture may be an exhaust (flue) gas from a power station or other large point source. In some embodiments, the method is applied to remove/capture $CO_2$ from a post-combustion gas mixture, for example a post-combustion gas mixture having a $CO_2$ concentration of 5 to 15 vol. %, preferably 6 to 14 vol. %, preferably 7 to 13 vol. %, preferably 8 to 12 vol. %, preferably 9 to 11 vol. %, preferably 10 vol. %, based on a total volume of the (post-combustion) gas mixture. Additionally, the post-combustion gas mixture may also include 70 to 75 vol. %, preferably 71 to 74 vol. %, preferably 72 to 73 vol. % of $N_2$ and 5 to 7 vol. %, preferably 5.5 to 6.5 vol. %, preferably 6 vol. % $H_2O$, each based a total volume of the (post-combustion) gas mixture. In some embodiments, the $CO_2$-capturing methods herein are performed post-combustion, i.e., the gas mixture is a post-combustion gas mixture, for example, a flue gas.

The $CO_2$ capture/removal methods of the present disclosure may be performed by contacting the gas mixture with the aminated magnesium oxide adsorbent disclosed herein to adsorb at least a portion of the $CO_2$ into/onto the aminated magnesium oxide adsorbent, thereby forming a loaded aminated magnesium oxide adsorbent and a gas stream depleted in $CO_2$ compared to the gas mixture.

Adsorption technologies may be employed herein for $CO_2$ capture, for example, the $CO_2$ may be adsorbed by the aminated magnesium oxide adsorbent via a physisorption process, meaning the process is primarily physical and preferably no permanent chemical changes occur on the aminated magnesium oxide adsorbent or to the $CO_2$ molecules. If chemical changes do occur, such changes are transient and reversible so that desorption may be achieved to form intact $CO_2$ molecules. As such, the aminated magnesium oxide adsorbent may be freestanding or supported on or within a substrate, for example, the aminated magnesium oxide adsorbent may be housed within a chamber, for example, a column, plug, or filter, and/or on/within a substrate such as silica, alumina, and the like. Preferably, the aminated magnesium oxide adsorbent may be supported within a fixed-bed column.

The chamber may be of any shape so long as the aminated magnesium oxide adsorbent can be securely housed and utilized inside the chamber to accomplish the gas adsorption. The chamber may include an inlet configured to accept a feed stream (gas mixture), a gas stream outlet configured to expel a permeate (a gas stream depleted in $CO_2$), and optionally a retentate outlet configured to expel a retentate (a $CO_2$ rich stream). The chamber can be configured to be pressurized so as to force the gas mixture though the inlet and through a bed of the aminated magnesium oxide adsorbent (and optionally a support) to enable infusion of $CO_2$ present in the gas mixture into the pore spaces of the aminated magnesium oxide adsorbent, thereby forming the loaded aminated magnesium oxide adsorbent. The chamber may also be connected to a vacuum pump to provide vacuum or a reduced pressure to the gas stream outlet for a similar purpose. Membrane gas separation technologies may also be employed herein for $CO_2$ capture, for example, the aminated magnesium oxide adsorbent may be utilized in a mixed matrix membrane by homogeneously interpenetrating the aminated magnesium oxide adsorbent of the present disclosure within a polymer matrix, along with other optional filler materials. In such cases, the aminated magnesium oxide adsorbent may be present in an amount of 0.1 to 50 wt. %, preferably 0.5 to 40 wt. %, preferably 1 to 30 wt. %, preferably 2 to 20 wt. %, preferably 3 to 15 wt. %, preferably 4 to 10 wt. %, preferably about 5 wt. %, relative to a total weight of the membrane.

The membrane may be a thin film membrane (e.g., a thickness of 10 to 2,000 μm), a flat sheet membrane, a spiral membrane, a tubular membrane, or a hollow fiber membrane. The membrane may be in the form of various shapes, for example, flat (e.g., for a disc-shaped membrane), bent, curved (e.g., a cylinder shaped membrane), and rippled. The membrane may have a porous morphology. For example, the membrane may contain unconnected pores each representing an isolated cavity having an unbroken pore wall, with the pores extending through the membrane without intersecting one another (e.g., monolithic membrane). Alternatively, the membrane may contain pores which are part of an interconnected network of pores where the pores in the membrane are randomly oriented and intersect. The membrane may contain micropores (an average diameter of less than 2 nm), mesopores (an average diameter of 2-50 nm), macropores (an average diameter larger than 50 nm), or a mixture thereof. For example, the membrane may be macroporous, having pores with an average diameter in a range of 0.5 to 10 μm, preferably 1 to 8 μm, preferably 1.5 to 6 μm, preferably 2 to 5 μm, preferably 3 to 4 μm.

The polymer matrix preferably has a high glass transition temperature ($T_g$), high melting point, and high crystallinity, i.e., the polymer is preferably a rigid, glassy polymer. In some embodiments, the polymer (of the polymer matrix) has a weight average molecular weight ($M_w$) of $1\times10^4$ to $2\times10^7$ g/mol, preferably $5\times10^4$ to $1.5\times10^7$ g/mol, preferably $1\times10^5$ to $1\times10^7$ g/mol.

Exemplary polymers that may be used to construct the polymer matrix in the disclosed mixed matrix membranes include, but are not limited to:
- polyolefins such as polyethylene, polypropylene, polybutene-1, and poly(4-methyl pentene-1), including polyvinyls and fluoropolymer variants thereof, for example polyvinylidene fluoride (PVDF), polytetrafluoroethylene (PTFE), polyvinyl chloride, polyvinyl fluoride, polyvinylidene chloride, polyvinylidene fluoride, polyvinyl alcohol, polyvinyl ester (e.g., polyvinyl acetate and polyvinyl propionate), polyvinyl pyridine, polyvinyl pyrrolidone, polyvinyl ether, polyvinyl ketone, polyvinyl aldehyde (e.g., polyvinyl formal and polyvinyl butyral), polyvinyl amide, polyvinyl amine, polyvinyl urethane, polyvinyl urea, polyvinyl phosphate, and polyvinyl sulfate;
- polystyrene (e.g., isotactic polystyrene and syndiotactic polystyrene), including styrene-containing copolymers such as acrylonitrilestyrene copolymers, styrene-butadiene copolymers and styrene-vinylbenzylhalide copolymers;
- thermoplastic elastomers (TPE);
- silicones such as polydimethylsiloxane (PDMS) and polymethylphenylsilicone (PMPS);
- polyacetylenes such as polytrimethylsilylpropyne;
- polysulfones including polyethersulfones (PESs) as well as sulfonated PESs, with specific mention being made to poly(1,4-phenylene ether-ether-sulfone), poly(1-hexadecene-sulfone), poly(1-tetradecene-sulfone), poly(oxy-1,4phenylenesulfonyl-1,4-phenylene), poly (oxy-1,4-phenylenesulfonyl-1,4-phenylene), poly(oxy-1,4-phenylenesulfonyl-1,4-phenylene), poly(oxy-1,4-phenylenesulfonyl-1,4-phenylene), polyphenylsulfone, and ULTRASON S 6010 from BASF;
- polysulfonamides such as poly[1-[4-(3-carboxy-hydroxy-phenylazo)benzenesulfonamido]-1,2-ethanediyl]);
- polyacetals;
- polyethers;
- polyethylenimines;
- polycarbonates;
- cellulosic polymers such as cellulose acetate, cellulose triacetate, cellulose acetate-butyrate, cellulose propionate, ethyl cellulose, methyl cellulose, and nitrocellulose;
- polyamides including aromatic polyamides and aliphatic polyamides, such as Nylon 6 and polyphthalamide;
- polyimides with specific mention being made to KAPTON (poly (4,4'-oxydiphenylene-pyromellitimide) by DuPont, MATRIMID by Huntsman Advanced Materials, P84 by HP Polymers GmbH, poly(3,3',4,4'-benzophenone tetracarboxylic dianhydride-pyromellitic dianhydride-3,3',5,5'-tetramethyl-4,4'-methylene dianiline) (or poly(BTDA-PMDA-TMMDA)), poly(3,3',4, 4'-benzophenone tetracarboxylic dianhydride-pyromellitic dianhydride-4,4'-oxydiphthalic anhydride-3,3',5, 5'-tetramethyl-4,4'-methylene dianiline) (or poly (BTDA-PMDA-ODPA-TMMDA)), poly(3,3',4,4'-diphenylsulfone tetracarboxylic dianhydride-3,3',5,5'-tetramethyl-4,4'-methylene dianiline) (or poly(DSDA-TMMDA)), poly(3,3',4,4'-benzophenone tetracarboxylic dianhydride-3,3',5,5'-tetramethyl-4,4'-methylene dianiline) (or poly(BTDA-TMMDA)), poly (3,3',4,4'-diphenylsulfone tetracarboxylic dianhydride-pyromellitic dianhydride-3,3',5,5'-tetramethyl-4,4'-methylene dianiline) (or poly(DSDA-PMDA-TMMDA)), and poly[2,2'-bis-(3,4-dicarboxyphenyl) hexafluoropropane dianhydride-2,2-bis(3-amino-4-hydroxyphenyl)-hexafluoropropane] (or poly(6FDA-APAF)), poly[2,2'-bis-(3,4-dicarboxyphenyl) hexafluoropropane dianhydride-2,4,6-trimethyl-1,3-phenylenediamine] (or poly(6FDA-DAM), poly[3,3',4, 4'-benzophenonetetracarboxylic dianhydride-2,2-bis (3-amino-4-hydroxyphenyl)-hexafluoropropane] (or poly(BTDA-APAF)), poly(3,3',4,4'-benzophenonetetracarboxylic dianhydride-3,3'-dihydroxy-4,4'-diamino-biphenyl) (or poly(BTDA-HAB)), poly[4,4'-oxydiphthalic anhydride-2,2-bis(3-amino-4-hydroxyphenyl)-hexafluoropropane] (or poly(ODPA-APAF)), poly[3,3', 4,4'-diphenylsulfone tetracarboxylic dianhydride-2,2-bis(3-amino-4-hydroxyphenyl)-hexafluoropropane] (or poly(DSDA-APAF)), poly(3,3',4,4'-diphenylsulfone tetracarboxylic dianhydride-3,3'-dihydroxy-4,4'-diamino-biphenyl) (or poly(DSDA-HAB)), poly[2,2'-bis-(3,4-dicarboxyphenyl) hexafluoropropane dianhydride-3,3',4,4'-benzophenonetetracarboxylic dianhydride-2, 2-bis(3-amino-4-hydroxyphenyl)-hexafluoropropane] (or poly(6FDA-BTDA-APAF)), poly[4,4'-oxydiphthalic anhydride-2,2-bis(3-amino-4-hydroxyphenyl)-hexafluoropropane-3,3'-dihydroxy-4,4'-diamino-biphenyl] (or poly(ODPA-APAF-HAB)), poly[3,3',4,4'-benzophenonetetracarboxylic dianhydride-2,2-bis(3- amino-4-hydroxyphenyl)-hexafluoropropane-3,3'-dihydroxy-4,4'-diamino-biphenyl] (or poly(BTDA-APAF-HAB)), poly[2,2'-bis-(3,4-dicarboxyphenyl) hexafluoropropane dianhydride-3,3'-dihydroxy-4,4'-diamino-biphenyl] (or poly(6FDA-HAB)), and poly(4,4'-bisphenol A dianhydride-3,3',4,4'-benzophenonetetracarboxylic dianhydride-2,2-bis(3-amino-4-hydroxyphenyl)-hexafluoropropane) (or poly(BPADA-BTDA-APAF));

polyetherimides such as ULTEM products manufactured by Sabic Innovative Plastics;

polyamide imides;

polyketones;

polyether ketones such as polyether ether ketone, sulfonated polyether ether ketone and the like;

polyarylene oxides such as polyphenylene oxide, polyxylene oxide, sulfonated polyxylene oxide and brominated polyxylene oxide;

polyurethanes;

polyureas;

polyazomethines;

polyesters including polyarylates such as polyethylene terephthalate and polyphenylene terephthalate;

acrylates such as polyalkyl (meth)acrylate, polyacrylate, polyacrylate-polyacrylamide copolymers;

polysulfides;

heterocyclic thermoplastics such as polybenzimidazoles, polyoxadiazoles, polytriazoles, polybenzoxazole, and polybenzimidazole;

polycarbodiimides;

polyphosphazines;

polyhydrazides;

and copolymers thereof, including block copolymers, grafts, and blends thereof.

The mixed matrix membrane may be made by methods known to those of ordinary skill in the art, for example, by casting or melt blending, and the polymer matrix may be made porous by known techniques including, but not limited to, irradiation, stretching of a melt-processed semi-crystalline polymer substrate, vapor-induced phase separation, and temperature-induced phase separation, just to name a few.

When the aminated magnesium oxide adsorbent of the present disclosure is utilized in mixed matrix membrane separation technologies, the membrane may be housed in chamber such that the membrane divides the chamber into a feed side and a permeate side. The gas mixture may then be fed into the feed side of the chamber so that at least a portion of the $CO_2$ present in the gas mixture permeates the membrane and is adsorbed by the aminated magnesium oxide adsorbent, thereby forming the loaded aminated magnesium oxide adsorbent. This may be accomplished for example by supplying the gas mixture at above atmospheric pressure or otherwise forcing at least a portion of the gas mixture through the membrane by pressurizing the feed side, or applying a vacuum to the permeate side of the chamber. A gas stream depleted in $CO_2$ compared to the gas mixture may then be collected from the permeate side, and the chamber may be optionally configured to include a retentate outlet to expel a retentate (a $CO_2$ rich stream) after desorbing $CO_2$ molecules from the loaded aminated magnesium oxide adsorbent.

Regardless of whether an adsorptive technique (e.g., fixed-bed of the aminated magnesium oxide adsorbent) or a membrane gas separation technology is utilized, the gas mixture is contacted with the aminated magnesium oxide adsorbent disclosed herein. The gas mixture may be contacted with the aminated magnesium oxide adsorbent in a single chamber, or the gas mixture may be passed through a series of chambers housing the aminated magnesium oxide adsorbent to gradually/sequentially remove/capture $CO_2$ from the gas mixture. Similarly, the aminated magnesium oxide adsorbent may be used in addition to other known adsorption materials to provide a gas stream depleted in $CO_2$ and a loaded aminated magnesium oxide adsorbent.

In some embodiments, prior to contacting the gas mixture with the aminated magnesium oxide adsorbent, the aminated magnesium oxide adsorbent may be activated through a degassing procedure performed in a sub-atmospheric pressure of 0.05 to 0.8 atm, preferably 0.1 to 0.5 atm, preferably 0.2 to 0.4 atm to remove gas or solvent molecules that may reside in the pore spaces of the aminated magnesium oxide adsorbent. The aminated magnesium oxide adsorbent may be degassed at a temperature of 0 to 200° C., preferably 10 to 150° C., preferably 25 to 100° C., or about 80° C. for 1 to 48 hours, preferably 2 to 36 hours, preferably 8 to 24 hours, preferably 12 to 18 hours.

A force may be provided to deliver the gas mixture into contact with the aminated magnesium oxide adsorbent. The gas mixture may be introduced at a flow rate of 0.001 to 1,000 L/min, preferably 0.005 to 500 L/min, preferably 0.01 to 100 L/min, preferably 0.05 to 10 L/min, preferably 0.1 to 5 L/min, preferably 0.5 to 2 L/min. In some embodiments, the gas mixture is pressurized (e.g., be applying pressure to a feed side of a chamber) at a pressure of greater than 760 and up to 4,000 Torr, preferably 800 to 3,500 Torr, preferably 850 to 3,000 Torr, preferably 900 to 2,500 Torr, preferably 1,000 to 2,000 Torr to force at least a portion of the gas mixture to contact the aminated magnesium oxide adsorbent. In some embodiments, the gas mixture is contacted with the aminated magnesium oxide adsorbent under vacuum, for example by applying a reduced pressure of less than 760 Torr, preferably 10 to 750 Torr, preferably 20 to 700 Torr, preferably 30 to 600 Torr to the permeate side of a chamber such that at least a portion of the gas mixture is brought into contact with the aminated magnesium oxide adsorbent. In preferred embodiments, the gas mixture is contacted with the aminated magnesium oxide adsorbent under vacuum at a reduced pressure of 60 to 160 Torr, preferably 70 to 150 Torr, preferably 80 to 140 Torr, preferably 90 to 130 Ton, preferably 100 to 120 Torr. Alternatively, the gas mixture may stay stagnant over the aminated magnesium oxide adsorbent (i.e. as an atmosphere to the aminated magnesium oxide adsorbent) for a suitable amount of time to enable adsorption of $CO_2$.

The gas mixture may be contacted with the aminated magnesium oxide adsorbent at any temperature that enables desired levels of $CO_2$ capture, for example, the gas mixture may have a temperature of −5 to 80° C., preferably 0 to 75° C., preferably 5 to 60° C., preferably 10 to 50° C., preferably 20 to 35° C., preferably 25 to 30° C. In preferred embodiments, desirable levels of $CO_2$ capture can be achieved with the aminated magnesium oxide adsorbent at ambient conditions, for example 20 to 25° C. and about 1 atm.

A gas stream depleted in $CO_2$ may be obtained after at least a portion of $CO_2$ is adsorbed onto the aminated magnesium oxide adsorbent. A composition of the gas stream depleted in $CO_2$ may vary depending on the composition of the gas mixture. In some embodiments, the gas stream depleted in $CO_2$ contains at least 25% less $CO_2$, preferably at least 30% less $CO_2$, preferably at least 40% less $CO_2$, preferably at least 50% less $CO_2$, preferably at least 60% less $CO_2$, preferably at least 70% less $CO_2$, preferably at least 80% less $CO_2$, preferably at least 90% less $CO_2$, preferably at least 95% less $CO_2$, by volume compared to a volume of $CO_2$ present in the gas mixture. For example, when the methods herein are employed in pre-combustion processes, the gas stream depleted in $CO_2$ may contain less than 35 vol % $CO_2$, preferably less than 25 vol % $CO_2$, preferably less than 20 vol % $CO_2$, preferably less than 15 vol % $CO_2$, preferably less than 10 vol % $CO_2$, preferably less than 5 vol % $CO_2$, preferably less than 1 vol % $CO_2$, preferably less than 0.5 vol % $CO_2$, preferably less than 0.1 vol % $CO_2$, based on a total volume of gas stream depleted in $CO_2$ When the methods herein are employed in post-combustion processes, the gas stream depleted in $CO_2$ may contain less than 10 vol % $CO_2$, preferably less than 8 vol % $CO_2$, preferably less than 6 vol % $CO_2$, preferably less than 4 vol % $CO_2$, preferably less than 2 vol % $CO_2$, preferably less than 1 vol % $CO_2$, preferably less than 0.5 vol % $CO_2$, preferably less than 0.1 vol % $CO_2$, preferably less than 0.05 vol % $CO_2$, preferably less than 0.01 vol % $CO_2$, based on a total volume of gas stream depleted in $CO_2$.

In some embodiments, the method of the present disclosure further involves desorbing the $CO_2$ from the loaded aminated magnesium oxide adsorbent, and reusing the aminated magnesium oxide adsorbent. The carbon dioxide may be stripped off the aminated magnesium oxide adsorbent using temperature swing adsorption (TSA) or pressure swing adsorption (PSA) techniques so the aminated magnesium oxide adsorbent can be reused. For instance, desorbing the $CO_2$ may involve heating the loaded aminated magnesium oxide adsorbent at a temperature of 50 to 200° C., preferably 60 to 180° C., preferably 70 to 160° C., preferably 80 to 140° C., preferably 90 to 120° C., preferably 100 to 110° C., subjecting the loaded aminated magnesium oxide adsorbent to a reduced pressure of less than 750 Torr, preferably less than 700 Torr, preferably less than 600 Torr, preferably less than 500 Torr, preferably less than 400 Torr, preferably less than 300 Torr, preferably less than 200 Torr, preferably less than 100 Torr, preferably less than 75 Torr, preferably less than 50 Torr, preferably less than 25 Torr, or a combination of heat and reduced pressure. The loaded aminated magnesium oxide adsorbent may also be regenerated (by passing a nitrogen gas stream over the loaded aminated magnesium oxide adsorbent. For example, a nitrogen gas stream may be flowed over the loaded aminated magnesium oxide adsorbent at a flow rate of 0.001 to 1,000 L/min, preferably 0.005 to 500 L/min, preferably 0.01 to 100 L/min, preferably 0.05 to 10 L/min, preferably 0.1 to 5 L/min, preferably 0.5 to 2 L/min, at a temperature of 50 to 200° C., preferably 60 to 180° C., preferably 70 to 160° C., preferably 80 to 140° C., preferably 90 to 120° C., for 1 to 60 minutes, preferably 5 to 50 minutes, preferably 10 to 40 minutes, preferably 20 to 35 minutes, preferably 30 minutes in order to desorb $CO_2$.

The loaded aminated magnesium oxide adsorbent may be regenerated (i.e. desorbed) and reused without a significant loss in $CO_2$ uptake capacity. For instance, the aminated magnesium oxide adsorbent may be used to capture $CO_2$, desorbed, and reused for up to 25 cycles, preferably up to 20 cycles, preferably up to 15 cycles, preferably up to 10 cycles, preferably up to 5 cycles, and the $CO_2$ uptake capacity may be reduced by no more than 10%, preferably no more than 8%, preferably no more than 6%, preferably no more than 4%, preferably no more than 3%, preferably no more than 2%, preferably no more than 1%, relative to an initial $CO_2$ uptake capacity of the aminated magnesium oxide adsorbent.

Desorbing the $CO_2$ from the loaded aminated magnesium oxide adsorbent generates a gas stream enriched in $CO_2$. Such a gas stream may be optionally subjected to further processing steps such as an additional purification step (e.g. column chromatography, further membrane separation steps, etc.), and any captured and collected $CO_2$ may optionally be subject to numerous processing steps, for example, used for the production of urea, methanol, metal carbonates and bicarbonates, aromatic and aliphatic polycarbonates, and sodium salicylate, as well as used in biotransformations to form fuels such as isobutyraldehyde and isobutanol, as is known to those of ordinary skill in the art.

In addition to pre-combustion and/or post-combustion $CO_2$ capture applications, it is contemplated that the aminated magnesium oxide adsorbents disclosed herein may be used in air purifiers, chemical filters, oil and gas refineries, fermenters, bioreactors, or in any other process where the capture/removal of $CO_2$ is desired.

In preferred embodiments, the methods herein rely on the adsorbent properties of the aminated magnesium oxide adsorbent, and no other sieving/support materials, such as those listed previously (e.g., hierarchical mesoporous silicates and aluminosilicates, carbonaceous materials, and molecular organic frameworks), are utilized for $CO_2$ capture.

The examples below are intended to further illustrate protocols for preparing the aminated magnesium oxide adsorbents and for using the aminated magnesium oxide adsorbents in $CO_2$ capture applications, and are not intended to limit the scope of the claims.

Where a numerical limit or range is stated herein, the endpoints are included. Also, all values and subranges within a numerical limit or range are specifically included as if explicitly written out.

The terms "comprise(s)", "include(s)", "having", "has", "contain(s)", and variants thereof, as used herein, are intended to be open-ended transitional phrases, terms, or words that do not preclude the possibility of additional acts or structures. The present disclosure also contemplates other embodiments "comprising", "consisting of" and "consisting essentially of", the embodiments or elements presented herein, whether explicitly set forth or not.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Materials and methods

Materials

Magnesium nitrate >99%, ammonium hydroxide (30%), oxalic acid, sodium hydroxide, ethanol, and APTES were used to prepare MgO-based adsorbents with different characteristics. All chemicals used were of an analytical grade or above; the chemicals were obtained from Sigma-Aldrich and used as received.

Preparation of porous MgO using ammonium hydroxide route (MgO—A) In this approach, MgO was synthesized first by dissolving 7 g of magnesium nitrate hexahydrate $(Mg(NO_3)_2.6H_2O)$ in 100 mL distilled water. After that, the mixture was stirred at room temperature until a homogenous magnesium nitrate solution was formed (~5 min). Then, an ammonium hydroxide (NH$_4$OH) solution (25 wt. % in water) was added to the magnesium nitrate solution to make the molar ratio of NH$_4$OH: Mg as 5:1. The addition of NH$_4$OH was followed by stirring for 5 min at room temperature. Then, the flask was tightly closed (to prevent ammonium hydroxide evaporation) and slowly heated in a water bath until the temperature reached 60° C. The mixture was maintained at this temperature under continuous stirring for 6 h. Then, the solution was removed from the water bath and kept at room temperature while stirring for another 24 h. The flask was kept open during this 24-h stirring process. The continuous stirring resulted in the formation of a thick paste (consists of Mg(OH)$_2$ and NH$_4$NO$_3$ in water) according to the following reaction (A. Hanif, S. Dasgupta, A. Nanoti, Facile Synthesis of High-Surface-Area Mesoporous MgO with Excellent High-Temperature CO$_2$ Adsorption Potential, Industrial & Engineering Chemistry Research, 55 (2016) 8070-8078, incorporated herein by reference in their entirety):

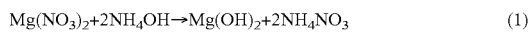

$$Mg(NO_3)_2 + 2NH_4OH \rightarrow Mg(OH)_2 + 2NH_4NO_3 \quad (1)$$

The paste was then washed with distilled water several times to remove NH$_4$NO$_3$. The dissolved NH$_4$NO$_3$ in water was removed through repeated 5-min centrifugation at 4500 rpm. This extensive wash would also remove any unreacted Mg(NO$_3$)$_2$·6H$_2$O. The produced Mg(OH)$_2$ was dried overnight in an oven at 60° C. The obtained solid was ground and then calcined for 10 h at 400° C. under air to yield MgO. The produced MgO using this preparation method (ammonium hydroxide) was designated as "MgO—A". Calcination at 300 and 500° C. was also conducted separately to probe the effect of the calcination temperature on the morphology, crystallinity, and porosity of MgO, in addition to its CO$_2$ adsorption capacity, which will be discussed later.

Preparation of Porous MgO Using an Oxalic Acid Route (MgO—O)

In this synthesis, 5.6 g of Mg(NO$_3$)$_2$·6H$_2$O and 2 g of oxalic acid (C$_2$H$_2$O$_4$) were dissolved separately in 25 mL ethanol. Then, a mixture of equimolar concentrations of Mg(NO$_3$)$_2$·6H$_2$O and C$_2$H$_2$O$_4$ was prepared by mixing the above two solutions. The resultant mixture was stirred vigorously at room temperature for 12 h to ensure the completion of the reaction. The products of the reaction between Mg(NO$_3$)$_2$·6H$_2$O and C$_2$H$_2$O$_4$ is a white gel consisting of magnesium oxalate (hydrate) (MgC$_2$O$_4$·2H$_2$O), nitric acid (HNO$_3$) and water according to the following reaction:

$$Mg(NO_3)_2 \cdot 6H_2O + (COOH)_2 \cdot 2H_2O \rightarrow MgC_2O_4 \cdot 2HNO_3 + 6H_2O \quad (2)$$

See A. Kumar, J. Kumar, On the synthesis and optical absorption studies of nano-size magnesium oxide powder, Journal of Physics and Chemistry of Solids, 69 (2008) 2764-2772, incorporated herein by reference in its entirety.

At this stage, the obtained white gel was first dried at 100° C. for 24 h to evaporate the formed nitric acid and water. Finally, the obtained white solid was ground and then it was calcined at 400° C. for 10 h under air, and the obtained magnesium oxide was labeled as "MgO—O".

p Preparation of Porous MgO Using Sodium Hydroxide Route (MgO—N)

In this MgO preparation method, about 5.13 g of Mg(NO$_3$)$_2$·6H$_2$O was dissolved in 100 mL distilled water to yield 0.2 M solution. To this solution, 0.5 M sodium hydroxide (NaOH) was added drop-wise, while stirring, until the pH of the solution reached 12.5. Then, the mixture was stirred at room temperature for 30 min. The reaction between Mg(NO$_3$)$_2$·6H$_2$O and NaOH produces a white precipitate of Mg(OH)$_2$ and sodium nitrate (NaNO$_3$) according to the following reaction:

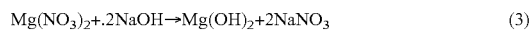

$$Mg(NO_3)_2 + 2NaOH \rightarrow Mg(OH)_2 + 2NaNO_3 \quad (3)$$

See R. Wahab, S. G. Ansari, M. A. Dar, Y. S. Kim, H. S. Shin, Synthesis of Magnesium Oxide Nanoparticles by Sol-Gel Process, Materials Science Forum, 558-559 (2007) 983-986, incorporated herein by reference in its entirety.

The sodium nitrate salt was removed through an extensive wash with ethanol and distilled water; Mg(OH)$_2$ was removed from the sodium nitrate solution via centrifugation at 4500 rpm for 5 min after every wash with ethanol or distilled water. After the last wash, Mg(OH)$_2$ was dried at 60° C. overnight. The obtained solid was ground before subjecting it to 10-h calcination at 400° C. under air. The obtained magnesium oxide was designated as "MgO—N".

Functionalization of MgO with APTES

In a typical synthesis procedure, 500 mg of the synthesized MgO—A was first dispersed in 600 mL distilled water by stirring for 5 min. Then, 1 g of APTES was added to the MgO—A suspension, followed by heating at 80° C. for 24 h while stirring and refluxing. After the completion of this solvent-assisted grafting of APTES to MgO, the sample was rinsed three times with distilled water, and the amine-modified MgO was obtained through centrifugation at 4500 rpm for 15 min after each rinse with distilled water. The collected precipitate was dried at 60° C. overnight; the dried sample is designated "APTES-MgO—A".

Characterization of the Synthesized Adsorbents

The synthesized MgO-based adsorbents were characterized using different techniques. The BET (Brunauer-Emmett-Teller) surface area of MgO-based adsorbents (including amine-functionalized MgO) was obtained through the measurements of nitrogen adsorption/desorption isotherms at −196° C. using an ASAP 2020 system (Micromeritics Instruments, Inc.). The morphologies of the synthesized MgO-based adsorbents and their elemental compositions were determined using a scanning electron microscopy (SEM) coupled with an energy-dispersive X-ray spectroscopy (EDX) technique. The crystallinity of the synthesized MgO-based adsorbents was studied using XRD pattern by XRD-6000 X-ray diffractometer with Curadiation 40 kV and 30 mA. Functional groups in the synthesized adsorbents were identified using Fourier Transform Infrared (FTIR) spectra (NICOLET 6700 spectrometer, Thermo Scientific) and recorded at room temperature in a wavenumber ranging from 400 to 4000 cm$^{-1}$ using KBr pellets.

Evaluation of CO$_2$ Adsorption On Mgo-Based Adsorbents

The measurements of CO$_2$ uptake capacity by the synthesized MgO-based adsorbents were carried out using the thermogravimetric analysis technique (TGA Q600 SDT). In each run, about 10 mg of one the synthesized adsorbents was placed on an alumina oxide pan and, then, the adsorbent was degassed at 120° C. using a stream of pure N$_2$ gas flowing at 100 mL/min. Once the weight of the sample reached a

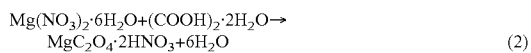

steady value (i.e., all water is removed), the temperature was dropped to 30° C. and left to equilibrate. After the stabilization of the adsorption temperature at 30° C., the valve of the carbon dioxide (99.9% pure) cylinder was opened, and the flow rate of $CO_2$ was kept constant at 100 mL/min. The adsorption pressure was 1 atm. The adsorption of $CO_2$ was monitored in time until the adsorption approached equilibrium (within 90 min contact between $CO_2$ and each adsorbent). While the above procedure was run with a pure $CO_2$ gas, any other gas mixture containing $CO_2$ can be used instead.

To assess the stability and regenerative properties of the most promising adsorbent (i.e., APTES-MgO—A), this adsorbent was regenerated by conducting 6 cycles of consecutive adsorption and regeneration. Regeneration was performed using pure $N_2$ gas flowing at 100 mL/min. The regeneration temperature and time were 120° C. and 30 min. The regeneration experiments of the spent adsorbent were carried out at atmospheric pressure (~1 atm). APTES-MgO—A was fully regenerated within less than 20 minutes of contact with the $N_2$ gas stream at the above regeneration conditions.

Characterization of the Synthesized Adsorbents

Figure 2:
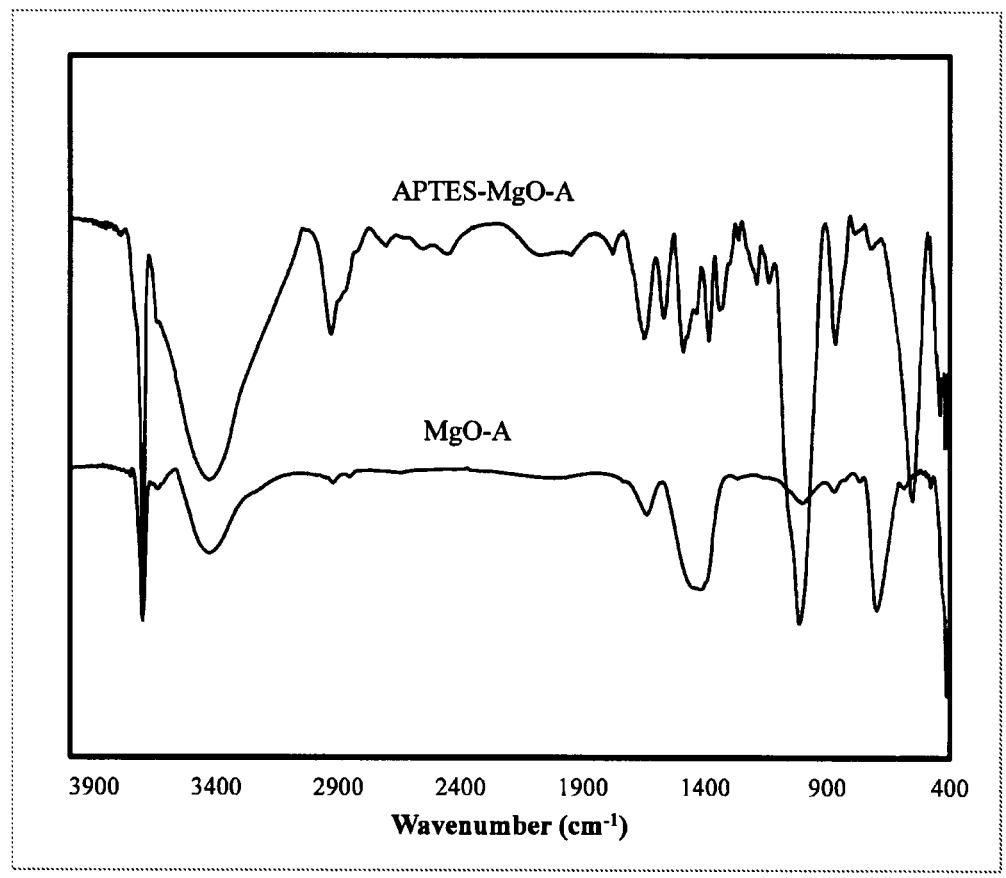
FIG. 2 shows the FTIR patterns of the unmodified MgO—A and the APTES-MgO—A adsorbent.

The synthesized MgO-based adsorbents were characterized using FTIR in order to confirm the formation of MgO and to get insights into the effects of different preparation methods, the calcination temperature, and the amine functionalization chemical properties of MgO. FIG. 2 presents the FTIR spectra of the parent (unmodified) MgO prepared using ammonium hydroxide (MgO—A). The spectral patterns of MgO—A, MgO—O, and MgO—N are comparable. The strong peaks appearing between 400 and 700 $cm^{-1}$ correspond to the metal-oxygen bending vibration, confirming the formation of magnesium oxide. See I. F. Mironyuk, V. M. Gun'ko, M. O. Povazhnyak, V. I. Zarko, V. M. Chelyadin, R. Leboda, J. Skubiszewska-Zięba, W. Janusz, Magnesia formed on calcination of $Mg(OH)_2$ prepared from natural bischofite, Applied Surface Science, 252 (2006) 4071-4082; and G. Song, S. Ma, G. Tang, X. Wang, Ultrasonic-assisted synthesis of hydrophobic magnesium hydroxide nanoparticles, Colloids and Surfaces A: Physicochemical and Engineering Aspects, 364 (2010) 99-104, each incorporated herein by reference in their entirety. The sharp and intense peaks at 3700 and 1650 $cm^{-1}$ and the broad peaks centered around 3400 and 1450 $cm^{-1}$ are associated with the presence of water moisture and/or the presence of some residual surface hydroxyl groups (—OH). See G. Song, S. Ma, G. Tang, X. Wang, Ultrasonic-assisted synthesis of hydrophobic magnesium hydroxide nanoparticles, Colloids and Surfaces A:

Physicochemical and Engineering Aspects, 364 (2010) 99-104; and M. Rezaei, M. Khajenoori, B. Nematollahi, Synthesis of high surface area nanocrystalline MgO by pluronic P123 triblock copolymer surfactant, Powder Technology, 205 (2011) 112-116, each incorporated herein by reference in their entirety. The minor peak appearing at 1100 $cm^{-1}$ for the MgO—O sample might be attributed to C—O stretching vibration. The reason for detecting this peak is likely due to the presence of some impurities remained from the starting materials (i.e., oxalic acid). See M. Rezaei, M. Khajenoori, B. Nematollahi, Synthesis of high surface area nanocrystalline MgO by pluronic P123 triblock copolymer surfactant, Powder Technology, 205 (2011) 112-116; and F. Meshkani, M. Rezaei, Facile synthesis of nanocrystalline magnesium oxide with high surface area, Powder Technology, 196 (2009) 85-88, each incorporated herein by reference in their entirety.

Despite the comparable spectral patterns of MgO—A, MgO—O, and MgO—N, their $CO_2$ adsorption capacities were reasonably different, to be presented and discussed later, with MgO—A adsorbing more $CO_2$ than the other two. Thus, the effect of the calcination temperature and amine-functionalization are only reported for MgO—A. As was the case with the different MgO synthesis routes, different calcination temperatures did not significantly alter the FTIR spectral pattern of the metal oxide, with the exception of the minor change in the peak intensity at 3700 $cm^{-1}$, related to water moisture and/or the presence of some residual surface hydroxyl groups (—OH). This peak becomes more intense at the higher calcination temperature of 500° C. The decrease in the peak intensity at 500° C. might be attributed to the removal of more hydroxyl groups at high calcination temperatures.

FIG. 2 also shows the FTIR spectra of MgO—A (prepared from ammonium hydroxide route and calcined at 400° C., which provides the highest $CO_2$ adsorption capacity as will be presented and discussed later) after functionalization with APTES (APTES-MgO—A). The functionalization of MgO—A with APTES resulted in the appearance of new peaks at 2960 and 2840 $cm^{-1}$, which are attributed to the C—H bonds of the amine molecules. The bands which appeared between 1560 and 1300 $cm^{-1}$ are associated with the NH and $NH_2$ deformation. See J. Wang, H. Chen, H. Zhou, X. Liu, W. Qiao, D. Long, L. Ling, Carbon dioxide capture using polyethylenimine-loaded mesoporous carbons, Journal of Environmental Sciences, 25 (2013) 124-132; Z. Zhang, B. Wang, Q. Sun, Fly Ash-derived Solid Amine Sorbents for CO2 Capture from Flue Gas, Energy Procedia, 63 (2014) 2367-2373; H. Y. Huang, R. T. Yang, D. Chinn, C. L. Munson, Amine-Grafted MCM-48 and Silica Xerogel as Superior Sorbents for Acidic Gas Removal from Natural Gas, Industrial & Engineering Chemistry Research, 42 (2003) 2427-2433; S.-M. Hong, S. H. Kim, a. K. B. Lee, Adsorption of Carbon Dioxide on 3-Aminopropyl-Triethoxysilane Modified Graphite Oxide, energy & fuels, 27 (2013) 3358-3363; and J. Pokhrel, N. Bhoria, S. Anastasiou, T. Tsoufis, D. Gournis, G. Romanos, G. N. Karanikolos, $CO_2$ adsorption behavior of amine-functionalized ZIF-8, graphene oxide, and ZIF-8/graphene oxide composites under dry and wet conditions, Microporous and Mesoporous Materials, 267 (2018) 53-67, each incorporated herein by reference in their entirety. The sharp peak at 1020 $cm^{-1}$ in the case of APTES-MgO—A corresponds to the asymmetric stretching vibration of the Si—O bond, which confirms the APTES attachment to MgO—A. See Pokhrel, N. Bhoria, S. Anastasiou, T. Tsoufis, D. Gournis, G. Romanos, G. N. Karanikolos, $CO_2$ adsorption behavior of amine-functionalized ZIF-8, graphene oxide, and ZIF-8/graphene oxide composites under dry and wet conditions, Microporous and Mesoporous Materials, 267 (2018) 53-67; and S. Yan, Y. Yang, L. Song, X. Qi, Y. Xue, B. Fan, Influence of 3-aminopropyltriethoxysilanegraphite oxide composite on thermal stability and mechanical property of polyethersulfone, High Performance Polymers, 29 (2016) 960-975, each incorporated herein by reference in their entirety.

In order to assess the crystallinity of the synthesized MgO samples, XRD analysis was performed, and the results for MgO—A are shown in FIG. 1. The unmodified MgO samples (MgO—A, MgO—O, and MgO—N) have comparable patterns. Each sample exhibits 5 diffraction peaks at 36.8°, 42.2°, 61.2°, 74.1°, and 77.9° that can be, respectively, assigned to the planes (111), (200), (220), (311) and (222) of cubic MgO, confirming its crystalline structure. These results are in a good agreement with the reported observations in the related literature. See Y.-D. Ding, G. Song, X. Zhu, R. Chen, Q. Liao, Synthesizing MgO with a high specific surface for carbon dioxide adsorption, RSC Advances, 5 (2015) 30929-30935; N. Rani, S. Chahal, A. S. Chauhan, P. Kumar, R. Shukla, S. K. Singh, X-ray Analysis of MgO Nanoparticles by Modified Scherer's Williamson-Hall and Size-Strain Method, Materials Today: Proceedings, 12 (2019) 543-548; and N. Yang, P. Ning, K. Li, J. Wang, MgO-based adsorbent achieved from magnesite for $CO_2$ capture in simulate wet flue gas, Journal of the Taiwan Institute of Chemical Engineers, 86 (2018) 73-80, each incorporated herein by reference in their entirety. The peaks intensity of the prepared MgO series at 42.2° decreased in the order of MgO—O>MgO—A>MgO—N. These results demonstrate that the magnesium oxide synthesized using the oxalic acid route has higher crystallinity than those prepared using ammonium hydroxide and sodium hydroxide. See A. Hanif, S. Dasgupta, A. Nanoti, Facile Synthesis of High-Surface-Area Mesoporous MgO with Excellent High-Temperature $CO_2$ Adsorption Potential, Industrial & Engineering Chemistry Research, 55 (2016) 8070-8078, incorporated herein by reference in their entirety. Upon the functionalization of MgO—A with APTES, new peaks appeared at ~50.2°, 58.7° and ~72.2° as shown in FIG. 1. Moreover, the intensity of the originally small peak of MgO—A at around 36.8° has significantly increased upon amine-functionalization. Furthermore, the main MgO—A peak at 42.2° has disappeared or its intensity dropped quite significantly. This is also the case for the original MgO—A peak at 61.2°. The other minor peaks of MgO—A at 74.1° and 77.9° have also vanished upon its functionalization with APTES. The appearance of new peaks at other diffraction angles as well as the decreased intensity of the MgO—A peaks at 42.2° and 61.2° confirm the attachments of the amine molecules between the MgO layers. See X. Xu, C. Song, J. M. Andresen, B. G. Miller, A. W. Scaroni, Preparation and characterization of novel $CO_2$ "molecular basket" adsorbents based on polymer-modified mesoporous molecular sieve MCM-41, Microporous and Mesoporous Materials, 62 (2003) 29-45; and S.-M. Hong, S. H. Kim, a. K. B. Lee, Adsorption of Carbon Dioxide on 3-Aminopropyl-Triethoxysilane Modified Graphite Oxide, energy & fuels, 27 (2013) 3358-3363, each incorporated herein by reference in its entirety.

In addition to studying the crystallinity of the MgO-based adsorbents, their textural properties (i.e., BET surface area, pore size, and pore volume) have been also investigated using the $N_2$-physisorption at 77 K. Table 1 summarizes the textural properties of the synthesized MgO-based adsorbents. The International Union of Pure and Applied Chemistry (IUPAC) has classified nanoporous adsorbents, based on pore size, into three main categories: macroporous (pore diameter>50 nm), mesoporous (2 nm<pore diameter<50 nm) and microporous (pore diameter<2 nm). See Y. Liu, B. Sajjadi, W.-Y. Chen, R. Chatterjee, Ultrasound-assisted amine functionalized graphene oxide for enhanced $CO_2$ adsorption, Fuel, 247 (2019) 10-18, incorporated herein by reference in its entirety. Accordingly, the MgO—A-based adsorbents synthesized in this work (see Table 1) fall into the mesoporous category. However, the pore sizes of the unmodified magnesium oxide adsorbents is influenced by the synthesis route used. MgO—A possesses the highest pore volume as a result of having the highest surface area.

TABLE 1

BET surface area, avg. pore size, and avg. pore volume of MgO-based adsorbents

| Samples | Surface area (BET) ($m^2$/g) | Avg. pore volume ($cm^3$/g) | Pore size (nm) |
|---|---|---|---|
| MgO—A | 350.12 | 0.414 | 4.73 |
| MgO—N | 149.27 | 0.598 | 16.03 |
| MgO—O | 124.08 | 0.546 | 17.59 |
| APTES-MgO—A | 134.43 | 0.301 | 8.95 |

Of the unmodified MgO adsorbents tested, MgO—A has the highest surface area. Notably, all three unmodified MgO displayed higher surface areas than those of MgO produced using templates. See M. Rezaei, M. Khajenoori, B. Nematollahi, Synthesis of high surface area nanocrystalline MgO by pluronic P123 triblock copolymer surfactant, Powder Technology, 205 (2011) 112-116; and Y.-D. Ding, G. Song, X. Zhu, R. Chen, Q. Liao, Synthesizing MgO with a high specific surface for carbon dioxide adsorption, RSC Advances, 5 (2015) 30929-30935, each incorporated herein by reference in its entirety. Furthermore, the three unmodified MgO adsorbents possess much higher surface areas than commercial MgO. For instance, MgO—A possesses a surface area of 350.12 $m^2$/g, which is over 10 times higher than the reported value for the commercial MgO, which is 32 $m^2$/g. See Y.-D. Ding, G. Song, X. Zhu, R. Chen, Q. Liao, Synthesizing MgO with a high specific surface for carbon dioxide adsorption, RSC Advances, 5 (2015) 30929-30935, incorporated herein by reference in its entirety. Benchmarking the surface areas of the three unmodified MgO with their crystallinity obtained from the XRD analysis reveals the inverse relationship between the surface area of an adsorbent and its crystallinity. See W. Gao, T. Zhou, B. Louis, Q. Wang, Hydrothermal Fabrication of High Specific Surface Area Mesoporous MgO with Excellent CO2 Adsorption Potential at Intermediate Temperatures, Catalysts, 7 (2017) 116, incorporated herein by reference in its entirety.

In order to investigate the effect of the functionalization of MgO with amines on its textural properties, the pore size, BET surface area, and pore volume of the amine-modified MgO—A have been measured. As shown in Table 1, all textural properties decreased upon functionalization with APTES, with the exception of the APTES-MgO—A pore size. The reductions in surface area and pore volume upon the attachment of the amine molecules to magnesium oxide are likely due to APTES filling some pores. See X. Xu, C. Song, J. M. Andresen, B. G. Miller, A. W. Scaroni, Novel Polyethylenimine-Modified Mesoporous Molecular Sieve of MCM-41 Type as High-Capacity Adsorbent for CO2 Capture, Energy & Fuels, 16 (2002) 1463-1469; and S.-H. Liu, W.-C. Hsiao, W.-H. Sie, Tetraethylenepentamine-modified mesoporous adsorbents for $CO_2$ capture: effects of preparation methods, Adsorption, 18 (2012) 431-437, each incorporated herein by reference in their entirety. Accordingly, the surface area of the parent MgO—A has dropped by a factor of 2.6 upon the functionalization with APTES, likely due to the fact that APTES is a relatively large molecule with 4 branches dangling from the silicon atom, which fill the pore spaces of the parent MgO—A.

It is interesting to note that despite having a surface area that is more 60% less than that of the unmodified MgO—A, the pore size of APTES-MgO—A is about 90% higher. Such an outcome might stem from the functionalization method used to attach the APTES to MgO—A. As presented in the Materials and methods section, the functionalization of MgO—A with APTES was carried out at 80° C. under continuous stirring and refluxing for 24 h. Such a thermal treatment, despite being mild, coupled with APTES attachment to MgO—A might have assisted in expanding the size of the pores of the APTES-MgO—A sample. See Y. Matsuo, Y. Nishino, T. Fukutsuka, Y. Sugie, Introduction of amino groups into the interlayer space of graphite oxide using 3-aminopropylethoxysilanes, Carbon, 45 (2007) 1384-1390, incorporated herein by reference in its entirety. The thermal treatment might have also enhanced the crystallinity of APTES-MgO—A and narrowed its pore size distribution. See J. M. Valverde, P. E. Sanchez-Jimenez, L. A. Perez-Maqueda, M. A. S. Quintanilla, J. Perez-Vaquero, Role of crystal structure on $CO_2$ capture by limestone derived CaO subjected to carbonation/recarbonation/calcination cycles at Ca-looping conditions, Applied Energy, 125 (2014) 264-275, incorporated herein by reference in its entirety.

Insights into the morphologies of the synthesized MgO-based adsorbents have been obtained using SEM imaging. It is clear from the SEM images that the particles of MgO—A are small in size with irregular platelet-like morphology. Contrarily, MgO—N particles are bigger in size than MgO—A, with an irregular sphere-like morphology. The irregular shape is also evident for the MgO—O particles, which resemble grains with a cubic-like morphology, and they are bigger in size than MgO—N and MgO—A. Such observations clearly demonstrate the impact of the chemistry of the MgO synthesis solution on its morphological properties even when the same magnesium salt (i.e., MgO precursor) is used. A similar observation has been reported in the literature on the effect of catalyst preparation protocol on its morphological properties. See E. Alvarado, L. M. Torres-Martinez, A. F. Fuentes, P. Quintana, Preparation and characterization of MgO powders obtained from different magnesium salts and the mineral dolomite, Polyhedron, 19 (2000) 2345-2351, incorporated herein by reference in its entirety. The results of SEM analysis are in line with the confirmed phase crystal using XRD that indicated MgO—O possesses the high crystallinity and has the largest particles size of the unmodified MgO samples tested.

As stated above, the chemistry of MgO synthesis solution has a significant influence on the product morphology. Thus, the effect of amine functionalization on the morphological properties was also analyzed. SEM images made clear that the morphology of the parent MgO—A was dramatically altered upon amine-functionalization with APTES, probably due to the coverage of the metal oxide surface with the amine molecules. Another observation that can be extracted from these images is the huge reduction in the porosity of the original MgO—A due to the filling of its pores with the amine molecules. Furthermore, the reduction in porosity confirmed the reduction trend obtained from the BET analysis, reported above. These observations are also in line with the reduction in surface area and porosity of graphene oxide upon its functionalization with 3-aminopropyltriethoxysilane and tetraethylenepentamine. See Hong et al. (2013); and Y. Zhang, Y. Chi, C. Zhao, Y. Liu, Y. Zhao, L. Jiang, Y. Song, $CO_2$ Adsorption Behavior of Graphite Oxide Modified with Tetraethylenepentamine, Journal of Chemical & Engineering Data, 63 (2018) 202-207, each incorporated herein by reference in their entirety.

The above characterization results have revealed useful information on the synthesized MgO-based adsorbents. Particularly, the FTIR results suggested the formation of magnesium oxide and its subsequent modification with amines. To support these results, elemental compositions of the synthesized MgO-based adsorbents have been analyzed using EDX, and the results are summarized in Table 2. According to the results presented in Table 2, all samples contain Mg and O, confirming the formation of magnesium oxide. However, unlike the pure MgO—A and MgO—N, MgO—O contains 6.64 wt % carbon. This carbon content is due to remaining oxalic acid, which was used along with magnesium nitrate to synthesize MgO—O, which was surprisingly not removed by washing and calcination. The MgO—N sample displayed the highest Mg/O ratio, followed by MgO—O, then MgO—A.

TABLE 2

Elemental composition of synthesized MgO-based adsorbents

| Sample | Mg wt % | O wt % | C wt % | N wt % | Si wt % |
|---|---|---|---|---|---|
| MgO—A | 47.2 | 52.8 | — | — | — |
| MgO—N | 56.9 | 43.1 | — | — | — |
| MgO—O | 44.6 | 48.76 | 6.64 | — | — |
| APTES-MgO—A | 23.3 | 43.3 | 23.1 | 2.55 | 7.75 |

Table 2 also shows the presence of carbon and nitrogen in the amine-functionalized sample (APTES-MgO—A), confirming the attachment of amines to MgO—A. APTES-MgO—A was found to have a relatively high C content and a relatively low N content, likely due to the fact that APTES contains only one N atom versus nine carbon atoms.

$CO_2$ Adsorption on the Synthesized Mgo-Based Adsorbents

The adsorption of $CO_2$ on the synthesized MgO-based adsorbents was carried out at ambient conditions (i.e., 30° C. and atmospheric pressure) using TGA. After the complete degassing of each adsorbent, $CO_2$ was pumped at a flow rate of 100 mL/min and the total mass of the system ($CO_2$ plus adsorbent) was followed in time until a steady value was approached. The adsorption of $CO_2$ was first investigated on the unmodified MgO, prepared using the three different synthesis routes, to probe the effect of the chemistry of the MgO synthesis solution on its $CO_2$ adsorption capacity. The $CO_2$ adsorption results using MgO—A were the highest of non-functionalized MgO adsorbents (shown in FIG. 3), which demonstrates the superiority of the magnesium oxide synthesized via the ammonium hydroxide route (i.e., MgO—A). For instance, the adsorbed amount of $CO_2$ on MgO—A when the adsorption process approached equilibrium is about 30 mg/g. In contrast, the adsorption capacity of $CO_2$ on MgO—N and MgO—O are about 25 and 24 mg/g, respectively. The $CO_2$ uptake capacities by the three MgO adsorbents are in a good agreement with the results of the textural analysis shown in Table 1. For example, MgO—A displays the highest porosity (i.e., the highest surface area and a high pore volume) amongst the three unmodified MgO adsorbents. This high porosity is likely to result in a higher adsorption capacity, according to some published reports. See Y.-D. Ding, G. Song, X. Zhu, R. Chen, Q. Liao, Synthesizing MgO with a high specific surface for carbon dioxide adsorption, RSC Advances, 5 (2015) 30929-30935; and K. K. Han, Y. Zhou, W. G. Lin, J. H. Zhu, One-pot synthesis of foam-like magnesia and its performance in $CO_2$ adsorption, Microporous and Mesoporous Materials, 169 (2013) 112-119, each incorporated herein by reference in their entirety. However, porosity alone cannot explain the close $CO_2$ adsorption capacity of MgO—N and MgO—O, despite that MgO—N possesses a higher porosity (e.g., the pore volume of MgO—N is about 9% higher than that of MgO—O). Therefore, the variations in the crystallinity and morphology of these adsorbents are likely to play a role. See J. M. Valverde, P. E. Sanchez-Jimenez, L. A. Perez-Maqueda, M. A. S. Quintanilla, J. Perez-Vaquero, Role of crystal structure on $CO_2$ capture by limestone derived CaO subjected to carbonation/recarbonation/calcination cycles at Ca-looping conditions, Applied Energy, 125 (2014) 264-275; and G.-B. Elvira, G.-C. Francisco, S.-M. Victor, M.-L. R. Alberto, MgO-based adsorbents for $CO_2$ adsorption: Influence of structural and textural properties on the $CO_2$ adsorption performance, Journal of Environmental Sciences, 57 (2017) 418-428, each incorporated herein by reference in their entirety.

Calcination temperature is one factor that might significantly alter the characteristics (e.g., crystallinity, morphology, porosity, compositions) of adsorbents and, accordingly, their adsorption capability. Thus, MgO—A was calcined at 300, 400, and 500° C. for 10 h. The $CO_2$ adsorption capacity results clearly demonstrate that calcination at 400° C. produces a MgO adsorbent with the highest $CO_2$ adsorption capacity relative to the other two calcination temperatures. Increasing the calcination temperature to 500° C. causes a significant reduction (nearly 30%) in the adsorption capacity, most likely due to a significant level of MgO agglomeration at this temperature. See R. Rajiv Gandhi, J. Suresh, S. Gown, D. S. Selvam, M. Sundrarajan, Effect of Calcination Temperature on Surface Morphology of Ionic Liquid Assisted MgO Nanoparticles by Sol-Gel Method, Advanced Science Letters, 16 (2012) 244-248, incorporated herein by reference in its entirety. A slight reduction (roughly 8%) in $CO_2$ adsorption capacity was encountered when MgO—A was calcined at 300° C. Such a slight reduction in $CO_2$ adsorption capacity might be attributed to the incomplete conversion of magnesium hydroxide to MgO at this calcination temperature. The presence of some magnesium hydroxide in the MgO sample is likely to negatively impact its $CO_2$ adsorption capacity. The very low $CO_2$ adsorption capacity of the as-prepared sample, which was not subjected to calcination, supports this assertion. Accordingly, the above results indicate that calcination temperature effects adsorbent properties, and that the most advantageous $CO_2$ adsorption properties are obtained when MgO—A is calcined at about 400° C. See G. Song, Y.-D. Ding, X. Zhu, Q. Liao, Carbon dioxide adsorption characteristics of synthesized MgO with various porous structures achieved by varying calcination temperature, Colloids and Surfaces A: Physicochemical and Engineering Aspects, 470 (2015) 39-45, incorporated herein by reference in its entirety.

Figure 3:
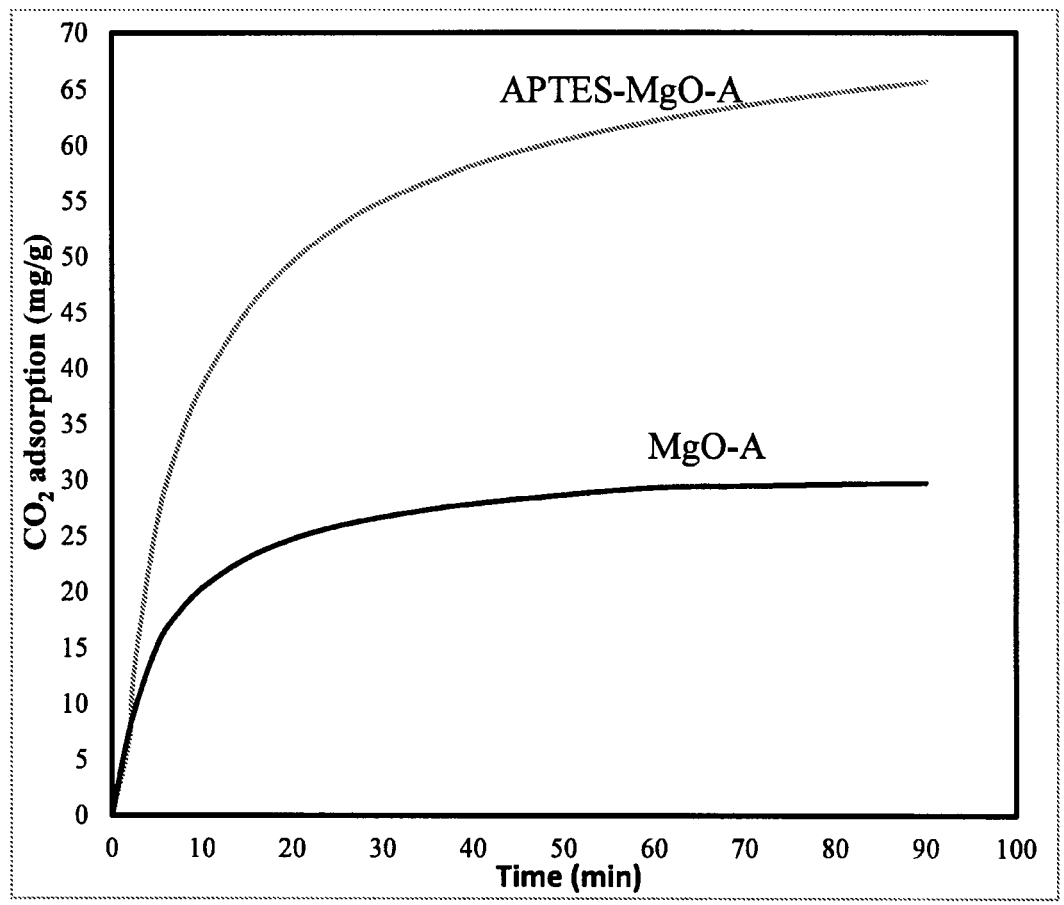
FIG. 3 shows the $CO_2$ capture at 30° C. and 1 atm using the unmodified MgO—A and the APTES-MgO—A adsorbent from a pure $CO_2$ gas stream flowing at 100 mL/min.

Although MgO—A, calcined at 400° C., provides the highest $CO_2$ uptake capacity among all unmodified MgO adsorbents, the adsorbed amount of $CO_2$ is still unsatisfactory. To enhance $CO_2$ adsorption, MgO—A was functionalized with APTES, and the adsorption of $CO_2$ on the amine-functionalized MgO—A is also shown in FIG. 3, which reveals the enhancement of $CO_2$ adsorption upon the functionalization of MgO—A with the APTES. For instance, the $CO_2$ adsorption capacity increased by more than 2-fold when MgO—A was functionalized with APTES (APTES-MgO—A $CO_2$ adsorption capacity of about 66 mg/g, compared to about 30 mg/g for MgO—A). The higher $CO_2$ adsorption capacity of APTES-MgO—A, despite having more than 2.5 times lower surface area than MgO—A, might be attributed to its higher pore size (pore diameter of APTES-MgO—A is almost 2 times as big as MgO—A) and higher $CO_2$ affinity of APTES molecules. See S.-M. Hong, S. H. Kim, a. K. B. Lee, Adsorption of Carbon Dioxide on 3-Aminopropyl-Triethoxysilane Modified Graphite Oxide, energy & fuels, 27 (2013) 3358-3363; and J. Pokhrel, N. Bhoria, S. Anastasiou, T. Tsoufis, D. Gournis, G. Romanos, G. N. Karanikolos, $CO_2$ adsorption behavior of amine-functionalized ZIF-8, graphene oxide, and ZIF-8/graphene oxide composites under dry and wet conditions, Microporous and Mesoporous Materials, 267 (2018) 53-67, each incorporated herein by reference in their entirety.

Regeneration of APTES-MgO—A Adsorbent

Figure 4:
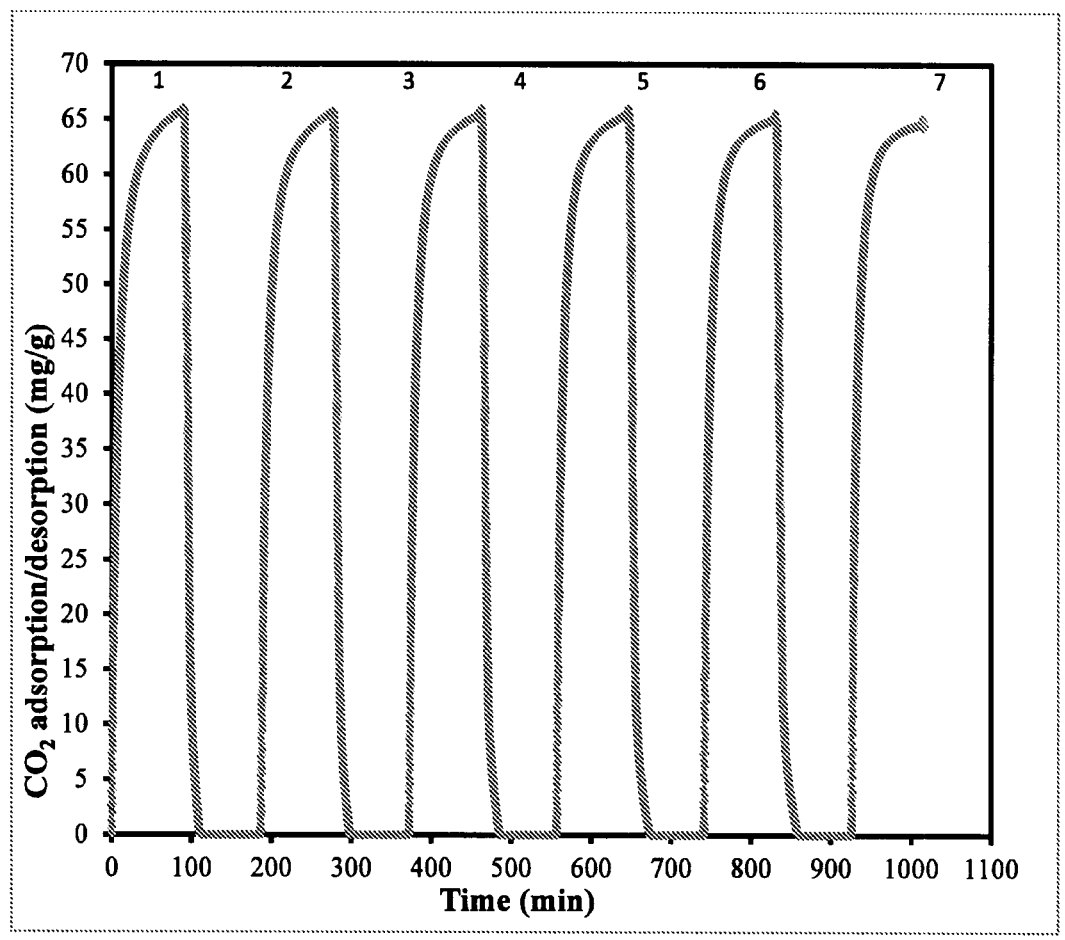
FIG. 4 shows the adsorption-regeneration cycles of $CO_2$ on APTES-MgO—A, with adsorption taking place at 30° C. and 1 atm from a pure $CO_2$ gas stream flowing at 100 mL/min, and with regeneration being performed at 120° C. and 1 atm with a pure $N_2$ gas stream flowing at 100 mL/min.

Regenerative properties and stability of $CO_2$ adsorbents are important economic factors. Accordingly, the ability of APTES-MgO—A to be regenerated and the stability of APTES-MgO—A was studied by conducting 6 consecutive adsorption-regeneration cycles as shown in FIG. 4. Adsorption of $CO_2$ was carried out from a pure $CO_2$ gas stream flowing at 100 mL/min at 30° C. and 1 atm. The regeneration was carried out at 120° C. and atmospheric pressure using 100 mL/min of pure $N_2$. It was observed that a 30-min regeneration time is sufficient to fully restore the adsorption capacity of the spent APTES-MgO—A. Six cycles of $CO_2$ adsorption followed APTES-MgO—A regeneration were performed without any noticeable reduction in the adsorbent capacity (e.g., <2% adsorption drop-off). This finding indicates that the APTES-MgO—A adsorbent is highly stable with excellent regenerative properties at a relatively low temperature compared to other adsorbents. See G. Xiao, R. Singh, A. Chaffee, P. Webley, Advanced adsorbents based on MgO and $K_2CO_3$ for capture of $CO_2$ at elevated temperatures, International Journal of Greenhouse Gas Control, 5 (2011) 634-639; and X. Zhao, G. Ji, W. Liu, X. He, E. J. Anthony, M. Zhao, Mesoporous MgO promoted with $NaNO_3/NaNO_2$ for rapid and high-capacity $CO_2$ capture at moderate temperatures, Chemical Engineering Journal, 332 (2018) 216-226, each incorporated herein by reference in its entirety. These characteristics of APTES-MgO—A, in addition to its desirable adsorption capacity at ambient conditions, make it a very promising candidate for commercial $CO_2$ capture with a minimal regeneration energy requirement.

Thus, the synthesized MgO-based adsorbents in this work are promising materials for $CO_2$ capture at ambient conditions. MgO can be produced via different synthesis routes; each route influencing the characteristics of the obtained MgO and, accordingly, its $CO_2$ adsorption capability. Among the three MgO synthesis routes tested, the ammonium hydroxide route offers the highest $CO_2$ adsorption performance. MgO synthesized using this route displayed the highest surface area and the highest $CO_2$ adsorption capacity. In addition to the chemistry of the MgO synthesis solution, the calcination temperature of the as-prepared material is also a factor to adsorbent properties. Calcination at 400° C. resulted in the highest $CO_2$ adsorption. On the other hand, higher calcination temperatures (e.g., 500° C.) caused agglomeration and a low calcination temperature (e.g., 300° C.) resulted in incomplete formation of MgO, each causing a lower adsorption capacity of the prepared material. Functionalization of MgO with amines resulted in an enhancement of $CO_2$ adsorption. Although the surface area is a key factor, it is not the only one. Pore size, amine-$CO_2$ interaction (i.e., amine affinity for $CO_2$) and adsorbent morphology are also important factors. Despite the relatively high affinity for $CO_2$ in the case of APTES-MgO—A, this adsorbent is completely and repeatedly regenerable, making it a good candidate for the commercial $CO_2$ capture applications, with low-energy consumption during the mild APTES-MgO—A regeneration process.

The invention claimed is:

1. An aminated magnesium oxide adsorbent, which is the reaction product of:
    a magnesium oxide matrix having disordered mesopores; and
    an amino silane;
    wherein amine functional groups are present on an external surface and within the disordered mesopores of the magnesium oxide matrix; and
    wherein the aminated magnesium oxide adsorbent has an average pore volume of 0.2 to 0.4 $cm^3$/g.

2. The aminated magnesium oxide adsorbent of claim 1, wherein the magnesium oxide matrix is prepared from precipitation of magnesium hydroxide from a solution of a magnesium salt and ammonium hydroxide, followed by calcination of the magnesium hydroxide at 350 to 450° C.

3. The aminated magnesium oxide adsorbent of claim 1, wherein the magnesium oxide matrix has a BET surface area of 320 to 380 $m^2$/g.

4. The aminated magnesium oxide adsorbent of claim 1, wherein the magnesium oxide matrix has an average pore volume of 0.3 to 0.5 $cm^3$/g and an average pore size of 3 to 6 nm.

5. The aminated magnesium oxide adsorbent of claim 1, wherein the magnesium oxide matrix consists essentially of magnesium oxide.

6. The aminated magnesium oxide adsorbent of claim 1, wherein the amino silane contains one amino group per molecule.

7. The aminated magnesium oxide adsorbent of claim 1, wherein the amino silane is of formula (I)

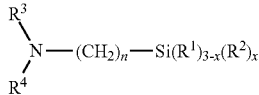

(I)

wherein
    $R^1$ is an optionally substituted alkoxy, an optionally substituted aryloxy, or a halo;
    $R^2$ is an optionally substituted alkyl, an optionally substituted aryl, or an optionally substituted arylalkyl;
    $R^3$ and $R^4$ are independently hydrogen, an optionally substituted alkyl, an optionally substituted aryl, or an optionally substituted arylalkyl;
    n is an integer of 2 to 16; and
    x is 0, 1, or 2.

8. The aminated magnesium oxide adsorbent of claim 7, wherein $R^1$ is methoxy or ethoxy, $R^2$ is methyl, ethyl, phenyl, or benzyl, $R^3$ and $R^4$ are each hydrogen, n is 2 or 3, and x is 0 or 1.

9. The aminated magnesium oxide adsorbent of claim 1, wherein the amino silane is 3-aminopropyl triethoxysilane.

10. The aminated magnesium oxide adsorbent of claim 1, which has a magnesium content of 15 to 31 wt. %, an oxygen content of 40 to 50 wt. %, a carbon content of 17.5 to 30 wt. %, a nitrogen content of 1 to 6 wt. %, and a silicon content of 2 to 12 wt. %, each based on a total weight of the aminated magnesium oxide adsorbent.

11. The aminated magnesium oxide adsorbent of claim 1, which has a BET surface area of 100 to 160 $m^2$/g.

12. The aminated magnesium oxide adsorbent of claim 1, which has an average pore size of 7 to 11 nm.

13. The aminated magnesium oxide adsorbent of claim 1, which is crystalline by XRD.

14. The aminated magnesium oxide adsorbent of claim 1, which has a $CO_2$ uptake capacity of 50 to 80 mg $CO_2$ per 1 g of the aminated magnesium oxide adsorbent at 30° C. and 1 atm.

15. A method of making the aminated magnesium oxide adsorbent of claim 1, the method comprising:
    precipitating magnesium hydroxide from a solution of a magnesium salt and ammonium hydroxide;
    calcining the magnesium hydroxide at 350 to 450° C. for 6 to 24 hours to form the magnesium oxide matrix having disordered mesopores; and
    aminating the magnesium oxide matrix with the amino silane at 60 to 100° C. for 12 to 48 hours.

16. The method of claim 15, wherein a molar ratio of the ammonium hydroxide to the magnesium salt in the solution is 2:1 to 9:1, and wherein the precipitating is performed by heating the solution to 50 to 70° C. for 3 to 10 hours, followed by stirring the solution at 20 to 30° C. for 12 to 48 hours.

17. The method of claim 15, wherein a weight ratio of the amino silane to the magnesium oxide matrix is 1.5:1 to 4:1.

18. A method of capturing $CO_2$ from a gas mixture comprising $CO_2$ and at least one other gas selected from the group consisting of hydrogen, oxygen, nitrogen, methane, and carbon monoxide, the method comprising:
    contacting the gas mixture with the aminated magnesium oxide adsorbent of claim 1 to adsorb at least a portion of the $CO_2$ into the aminated magnesium oxide adsorbent, thereby forming a loaded aminated magnesium oxide adsorbent and a gas stream depleted in $CO_2$ compared to the gas mixture.

19. The method of claim 18, wherein the gas mixture is a pre-combustion gas mixture comprising 15 to 50 vol. % of $CO_2$, based on a total volume of the gas mixture.

20. The method of claim 18, wherein the gas mixture is a post-combustion gas mixture comprising 5 to 15 vol. % of $CO_2$, based on a total volume of the gas mixture.

* * * * *